United States Patent
Kim et al.

(10) Patent No.: US 9,612,908 B2
(45) Date of Patent: Apr. 4, 2017

(54) PERFORMING MEMORY DATA SCRUBBING OPERATIONS IN PROCESSOR-BASED MEMORY IN RESPONSE TO PERIODIC MEMORY CONTROLLER WAKE-UP PERIODS

(71) Applicant: QUALCOMM Incorporated, San Diego, CA (US)

(72) Inventors: Taehyun Kim, Cupertino, CA (US); Sungryul Kim, San Diego, CA (US); Jung Pill Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/627,268

(22) Filed: Feb. 20, 2015

(65) Prior Publication Data

US 2016/0246679 A1    Aug. 25, 2016

(51) Int. Cl.
*G06F 11/00* (2006.01)
*G06F 11/14* (2006.01)
(Continued)

(52) U.S. Cl.
CPC ........ *G06F 11/1402* (2013.01); *G06F 11/106* (2013.01); *G06F 12/023* (2013.01); *G06F 2201/805* (2013.01); *G06F 2212/69* (2013.01)

(58) Field of Classification Search
CPC ............... G06F 11/1402; G06F 12/023; G06F 2201/805; G06F 2212/69
See application file for complete search history.

(56) References Cited

U.S. PATENT DOCUMENTS 6,144,219 A * 11/2000 Palaniswami ....... G11C 11/4074
326/33
6,838,331 B2 * 1/2005 Klein .................... G06F 1/3225
257/300
(Continued)

OTHER PUBLICATIONS

International Search Report and Written Opinion for PCT/US2016/015933, mailed May 24, 2016, 10 pages.
(Continued)

*Primary Examiner* — Esaw Abraham
(74) *Attorney, Agent, or Firm* — Withrow & Terranova, PLLC

(57) ABSTRACT

Aspects of the disclosure involve memory data scrubber circuits configured to perform memory data scrubbing operations in a processor-based memory to provide data error correction in response to periodic memory controller wake-up periods. Memory data scrubbing is performed to correct errors in data words stored in memory. Memory data scrubbing is initiated in the memory to conserve power in response to periodic memory controller wake-up periods during processor idle periods. Further, in certain aspects disclosed herein, the memory data scrubber circuit is provided as a separate system outside of the memory controller in the memory system. In this manner, power consumption can be further reduced, because the memory data scrubber circuit can continue with memory data scrubbing operations in the memory independent of the memory controller operation, and after the memory controller access commands issued during the wake-up period are completed and the memory controller is powered-down.

30 Claims, 19 Drawing Sheets

(51) Int. Cl.
*G06F 12/02* (2006.01)
*G06F 11/10* (2006.01)

(56) References Cited

U.S. PATENT DOCUMENTS

| | | |
|---|---|---|
| 7,043,679 B1 | 5/2006 | Keltcher et al. |
| 7,246,269 B1 | 7/2007 | Hamilton |
| 7,477,547 B2 * | 1/2009 | Lin ................ G06F 11/106 365/185.09 |
| 7,882,314 B2 * | 2/2011 | Allison ............ G06F 11/106 711/158 |
| 7,936,610 B1 | 5/2011 | Melcher et al. |
| 8,484,521 B2 * | 7/2013 | Carman ............... G11C 29/52 365/185.11 |
| 8,705,294 B2 | 4/2014 | Jeong |
| 8,726,126 B2 | 5/2014 | Post |
| 8,823,428 B2 * | 9/2014 | Park ................ G11O 5/148 327/142 |
| 9,053,808 B2 * | 6/2015 | Sprouse ............. G11C 16/3418 |
| 9,081,719 B2 * | 7/2015 | Ramaraju ............. G06F 12/12 |
| 9,170,639 B2 * | 10/2015 | Henderson ........... G06F 1/3275 |
| 2011/0231730 A1 | 9/2011 | Allen |
| 2013/0003451 A1 | 1/2013 | Bedeschi et al. |
| 2014/0059405 A1 | 2/2014 | Syu et al. |

OTHER PUBLICATIONS

Second Written Opinion for PCT/US2016/015933, mailed Jan. 25, 2017, 8 pages.

\* cited by examiner

PERFORMING MEMORY DATA SCRUBBING OPERATIONS IN PROCESSOR-BASED MEMORY IN RESPONSE TO PERIODIC MEMORY CONTROLLER WAKE-UP PERIODS

BACKGROUND

I. Field of the Disclosure

The technology of the disclosure relates generally to memory data scrubbing in processor-based memory to provide data error correction to memory words stored in the memory.

II. Background

Magnetic random access memory (MRAM) is non-volatile memory in which data is stored by programming a magnetic tunnel junction (MTJ) as part of an MRAM bitcell. In this regard, an exemplary MTJ 100 that can be provided in an MRAM bitcell is illustrated in FIG. 1. Data is stored in the MTJ 100 according to the magnetic orientation between two layers: a free ferromagnetic layer 102 ("free layer 102") disposed above a fixed or pinned ferromagnetic layer 104 ("pinned layer 104"). The free and pinned layers 102, 104 are separated by a tunnel junction or barrier 106 formed by a thin non-magnetic dielectric layer. When the magnetic orientations of the free and pinned layers 102, 104 are anti-parallel (AP) to each other (shown in FIG. 1 as MTJ 100'), a first memory state exists (e.g., a logical '1'). When the magnetic orientations of the free and pinned layers 102, 104 are parallel (P) to each other (shown in FIG. 1 as MTJ 100"), a second memory state exists (e.g., a logical '0'). The magnetic orientations of the free and pinned layers 102, 104 can be sensed to read data stored in the MTJ 100 by sensing the resistance when current flows through the MTJ 100. Data can also be written and stored in the MTJ 100 by applying a magnetic field to change the orientation of the free layer 102 to either a P or AP magnetic orientation with respect to the pinned layer 104.

One advantage of an MRAM is that MTJs in MRAM bitcells can retain stored information even when power is turned off. This is because data is stored in an MTJ as a small magnetic element rather than an electric charge or current. For example, in the MTJ 100 in FIG. 1, the free and pinned layers 102, 104 can store information even when the magnetic H-field is '0' due to a hysteresis loop 108 of the MTJ 100.

One disadvantage of MRAM is data retention failure. The switching success ratio of a MTJ is not one hundred percent (100%) due to the probabilistic switching nature of the free layer in an MTJ. Further, as the integration density of computer memory chips increase, thus decreasing the size of individual memory cell structures, MRAM bitcells in an MRAM become more vulnerable to soft errors. Soft errors in MRAM bitcells are bit flip errors that can be caused by thermal stability issues in an MTJ. While the probability of a soft error occurring in an individual MRAM bitcell is low, the probability of soft errors occurring in an MRAM can still be significant, because a large amount of memory is typically provided in computer systems. Further, computer systems employing MRAM have months of uptime, which increases the possibility of soft errors occurring between power cycles and/or resets.

Data error correction systems, such as error-correcting code (ECC) systems, can be employed in MRAM systems to detect and correct bit errors that occur, including soft errors and the probabilistic switching nature of MTJs in an MRAM. In an ECC system, an ECC is calculated and stored in an ECC memory for each memory word written to memory. When a memory word is read from a memory location, an ECC is calculated on the stored memory word to determine if the ECC matches the ECC previously stored for a memory location when the memory word was written. If the ECCs match, the memory word is determined to not contain an error. If the ECCs don't match, the missing or erroneous bits in the memory word stored at the memory location are determined and fixed in the memory word provided for the read operation.

An ECC system can be provided as part of a memory data scrubbing process for an MRAM system. In a memory data scrubbing process, a memory controller in the MRAM system systematically scans through memory locations in the MRAM, detects bit errors at the scanned memory locations, and writes back corrected data to scanned memory locations that have bit errors. However, central processing unit (CPU) performance is decreased as a result of performing memory data scrubbing operations during regular CPU operation. To avoid such decrease in CPU performance, memory data scrubbing can be performed by a memory controller during CPU idle periods. The memory controller is powered up to provide memory data scrubbing during the CPU idle periods. However, additional power is still consumed in an undesirable manner by the memory controller when powering up to provide memory data scrubbing.

SUMMARY OF THE DISCLOSURE

Aspects of the disclosure involve memory data scrubber circuits configured to perform memory data scrubbing operations in a processor-based memory to provide data error correction in response to periodic memory controller wake-up periods. Related memory systems, methods, and computer-readable media are also disclosed. Memory data scrubbing is performed to correct errors in data words stored in memory. In certain non-limiting aspects disclosed herein, the memory is a magnetic random access memory (MRAM) that employs magnetic tunnel junctions (MTJs) in MRAM bitcells having a probabilistic switching nature that may cause errors. Memory data scrubbing is initiated in the memory to conserve power in response to periodic memory controller wake-up periods during processor idle periods. This is opposed to performing memory data scrubbing during active processor periods. Further, in certain aspects disclosed herein, the memory data scrubber circuit is provided as a separate system outside of the memory controller in the memory system. In this manner, power consumption can be further reduced, because the memory data scrubber circuit can continue with memory data scrubbing operations in the memory independent of the memory controller operation, and after the memory controller access commands issued during the wake-up period are completed and the memory controller is powered-down.

In this regard in one aspect, a memory system for a processor-based system is provided. The memory system comprises a memory. The memory system also comprises a memory controller configured to periodically power-up during idle periods of a processor. The memory controller is further configured to generate a power-up signal indicating a powered-up state of the memory controller. The memory system also comprises a memory data scrubber circuit. The memory data scrubber circuit is configured to receive the power-up signal from the memory controller, and perform a memory data scrubbing operation on at least one next scrubbing memory address in the memory in response to receiving the power-up signal from the memory controller.

In another aspect, a memory system for a processor-based system is provided. The memory system comprises a means for storing data, and a means for controlling. The means for controlling is configured for periodically powering-up during idle periods of a processor. The means for controlling is also configured for generating a power-up signal indicating a powered state of a memory controller. The memory system also comprises a means for scrubbing. The means for scrubbing is configured for receiving the power-up signal from the means for controlling. The means for scrubbing is further configured for performing a memory data scrubbing operation on at least one next scrubbing memory address in the means for storing data in response to receiving the power-up signal from the means for controlling.

In another aspect, a method for scrubbing memory data in a memory of a memory system for a processor-based system is provided. The method comprises receiving a power-up signal from a memory controller in response to the memory controller waking-up during a processor idle period. The method also comprises performing a memory data scrubbing operation on at least one next scrubbing memory address in the memory in response to the received power-up signal from the memory controller.

In another aspect, a non-transitory computer-readable medium is provided. The non-transitory computer-readable medium has stored thereon computer executable instructions which, when executed by a processor, cause the processor to receive a power-up indicator from a memory controller waking-up during a processor idle period, and perform a memory data scrubbing operation on at least one next scrubbing memory address in the memory in response to the received power-up indicator indicating a powered-up state of the memory controller.

DETAILED DESCRIPTION

Figure 1:
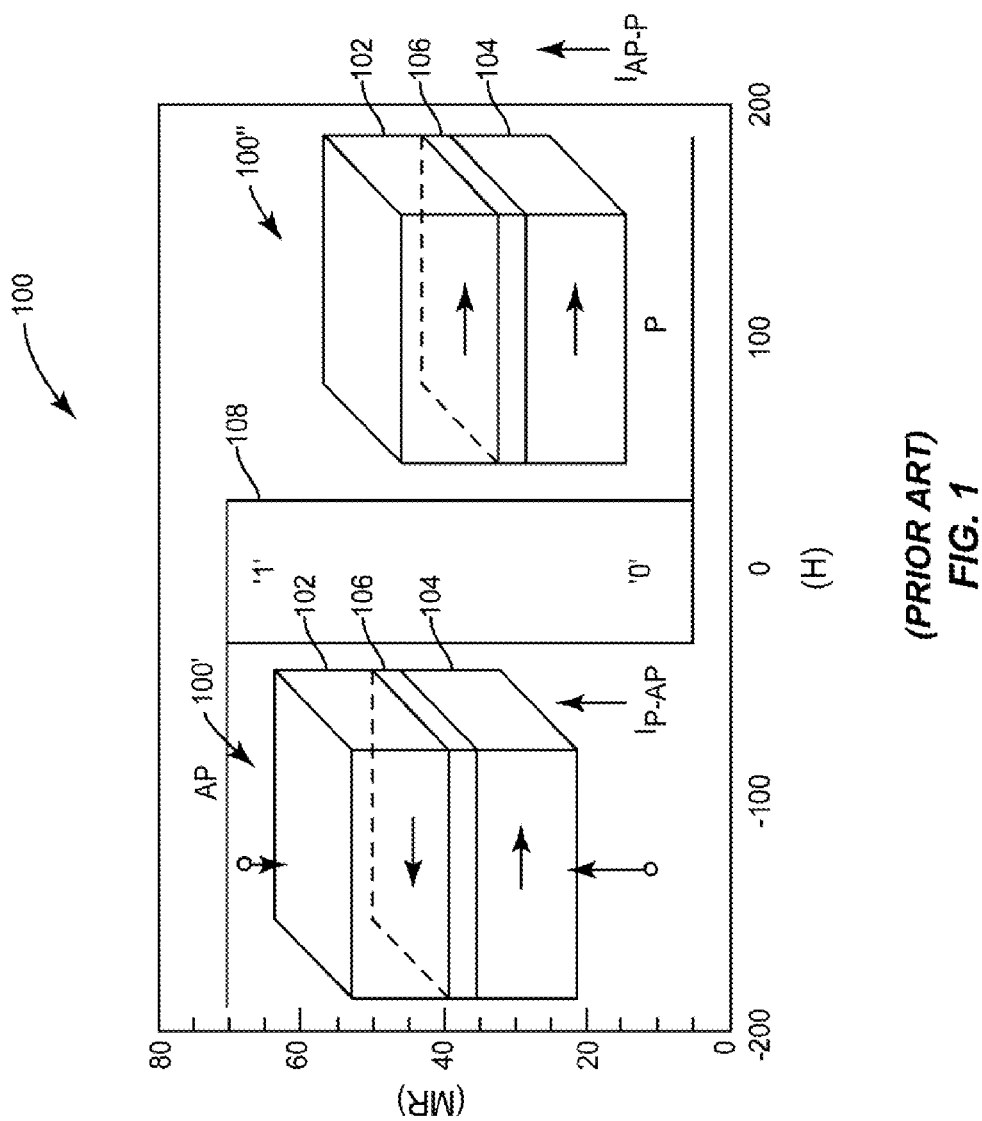
FIG. 1 in a schematic of an exemplary prior art magnetic tunnel junction (MTJ) that can be employed in a magnetic random access memory (MRAM), wherein the MTJ is shown in both parallel and anti-parallel storage states.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects of the disclosure involve memory data scrubber circuits configured to perform memory data scrubbing operations in a processor-based memory to provide data error correction in response to periodic memory controller wake-up periods. Related memory systems, methods, and computer-readable media are also disclosed. Memory data scrubbing is performed to correct errors in data words stored in memory. In certain non-limiting aspects disclosed herein, the memory is a magnetic random access memory (MRAM) that employs magnetic tunnel junctions (MTJs) in MRAM bitcells having a probabilistic switching nature that may cause errors. Memory data scrubbing is initiated in the memory to conserve power in response to periodic memory controller wake-up periods during processor idle periods. This is opposed to performing memory data scrubbing during active processor periods. Further, in certain aspects disclosed herein, the memory data scrubber circuit is provided as a separate system outside of the memory controller in the memory system. In this manner, power consumption can be further reduced, because the memory data scrubber circuit can continue with memory data scrubbing operations in the memory independent of the memory controller operation, and after the memory controller access commands issued during the wake-up period are completed and the memory controller is powered-down.

Figure 2:
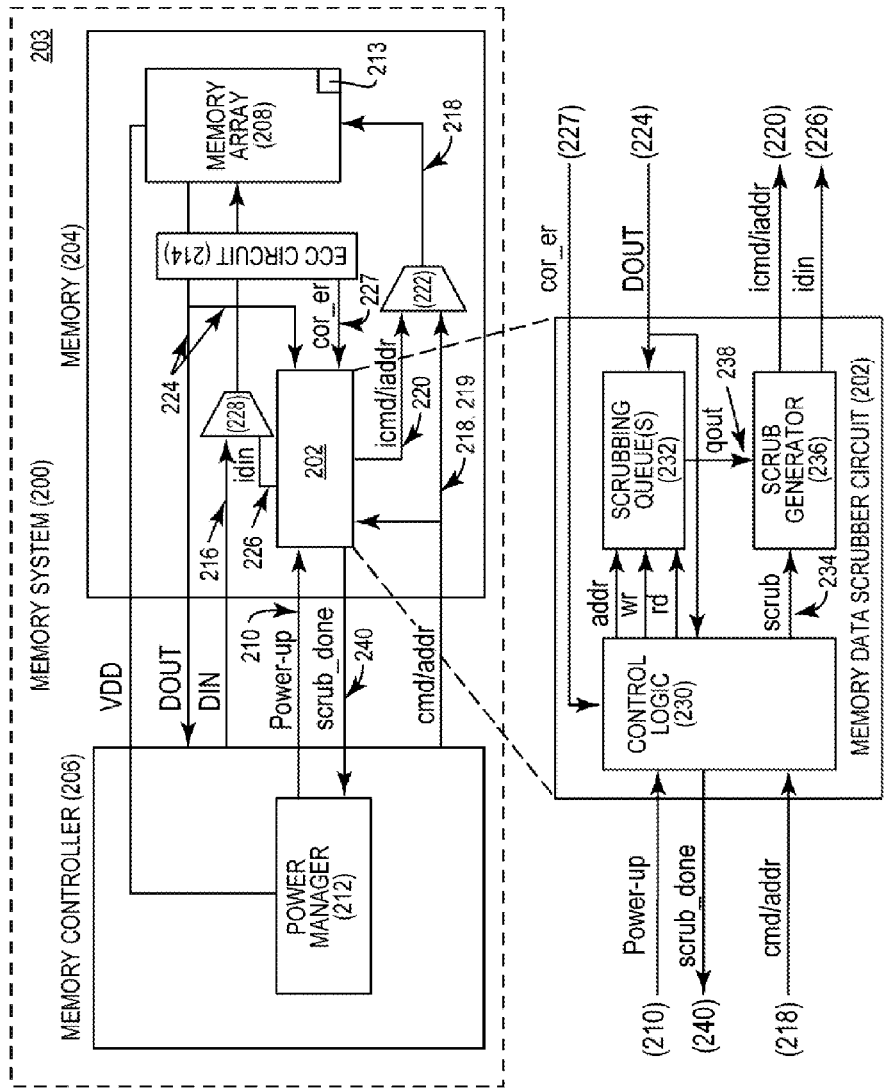
FIG. 2 is a schematic diagram of an exemplary processor-based memory system that employs an exemplary memory data scrubber circuit configured to perform memory data scrubbing in a memory to provide data error correction in response to periodic wake-up periods of a memory controller.

In this regard, FIG. 2 is a schematic diagram of an exemplary processor-based memory system 200 (referred to as "memory system 200") that employs a memory data scrubber circuit 202. Exemplary internal components of the memory data scrubber circuit 202, which are discussed in more detail below, are also shown in FIG. 2. The memory system 200 can be provided in an integrated circuit (IC) 203 in a processor-based system (not shown), such as a central processing unit (CPU)-based system, to provide a memory for storing data and accessing the data. As will be discussed in more detail below, the memory data scrubber circuit 202 is configured to perform memory data scrubbing in a memory 204 to provide data error correction in response to periodic wake-up periods of a memory controller 206. The memory controller 206 is configured to perform memory access requests to the memory 204 for writing and reading data. A memory array 208 is provided in the memory 204 for storing data. During active periods of a processor in which the memory system 200 is included, the memory controller 206 receives memory access requests from the processor for accessing the memory array 208. However, even when a processor is in an idle mode during periods of inactivity to conserve power, the processor and the memory controller 206 in this example periodically wake up to perform various transactions, such as handling interrupts or requests from other peripherals, which may require memory transactions to the memory 204. For example, the memory controller 206 may wake-up every ten (10) seconds during processor idle times to respond to requests by the processor to perform memory transactions to the memory 204.

Figure 3:
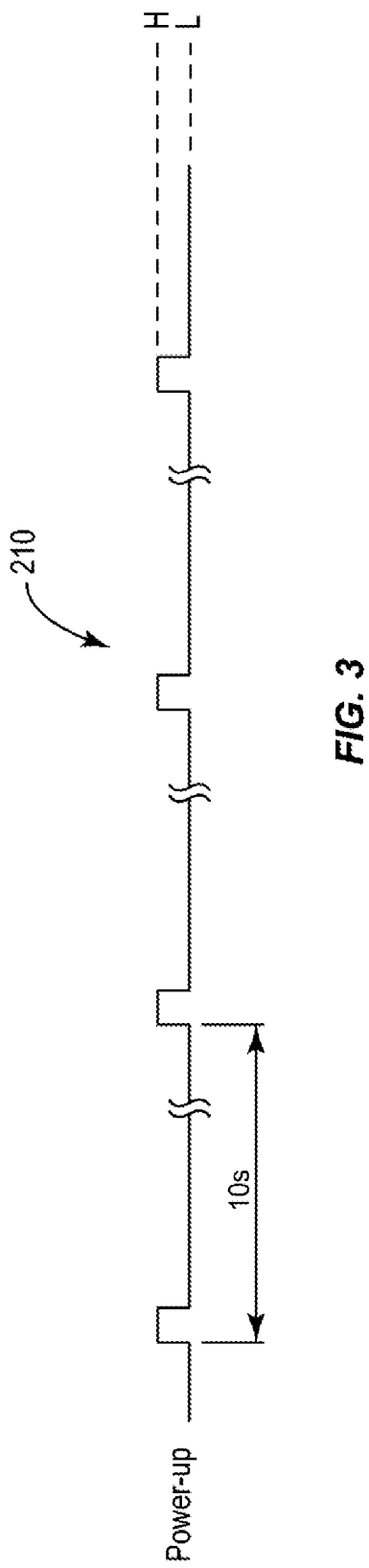
FIG. 3 is an exemplary timing diagram illustrating wake-up periods of the memory controller in the memory system in FIG. 2 during central processing unit (CPU) idle periods.

In this regard, with continuing reference to FIG. 2, the memory controller 206 in the memory system 200 in FIG. 2 is configured to generate a power-up signal 210 indicating a powered stated of the memory controller 206. In this example, a power manager 212 provided in the memory controller 206 is configured to generate the power-up signal 210. The power-up signal 210 indicates if the memory controller 206 is in a powered-up state or a powered-down state. A powered-up state means sufficient power is provided for operation. A powered-down state does not necessarily mean no power is consumed, but rather can be a reduced power level to conserve power during idle, or non-active periods. The memory data scrubber circuit 202 receives the power-up signal 210. For example, FIG. 3 illustrates an exemplary power-up signal 210 where a higher signal level H (e.g., Vdd) indicates a power-up state and a lower signal level L (e.g., ground) indicates a powered-down state. As shown in the example in FIG. 3, the power-up signal 210 is generated to provide a powered-up state every ten (10) seconds, meaning that the memory controller 206 is programmed to wake-up and be powered-on every ten (10) seconds when the processor wakes up during idle periods. The memory data scrubber circuit 202 receives the power-up signal 210. The memory data scrubber circuit 202 is then configured to perform a memory data scrubbing operation on a next scrubbing memory address in the memory array 208 in memory 204 in response to receiving the power-up signal 210 from the memory controller 206. In this manner, memory data scrubbing operations can be performed in the memory array 208 after the processor and the memory controller 206 wake up from idle periods or just before power is collapsed to conserve power.

Memory data scrubbing involves reading of data from memory addresses (i.e., memory locations) in the memory array 208, correcting bit errors, if any, with a correcting code, and writing the corrected data back to the same memory address. Memory data scrubbing can be performed by the memory data scrubber circuit 202 for any type of memory array 208. However, if the memory array 208 is comprised of a magnetic random access memory (MRAM), performing memory data scrubbing of the memory array 208 may be important. Due to the probabilistic nature of switching of a magnetic tunnel junction (MTJ) provided in MRAM bitcells in an MRAM, data may be erroneously written to MRAM bitcells at a particular memory address. The memory data scrubbing operations performed by the memory data scrubber circuit 202 can detect and correct such errors.

The memory data scrubber circuit 202 may only perform memory data scrubbing operations on one or a few memory addresses in the memory array 208. Thus, it may take weeks or months to completely data scrub the memory array 208 in the memory system 200 in FIG. 2 if the memory data scrubbing is performed periodically during processor idle times in response to a powered-up state of the memory controller 206 indicated on the power-up signal 210. In this regard, a next scrubbing memory address 213 may be stored in a register in the memory array 208 to indicate the next memory address(es) in the memory array 208 to be data scrubbed during a given powered-up state of the memory controller 206. However, periodic data scrubbing in response to the memory controller 206 waking-up into a powered-up state is performed to keep data stored in the memory array 208 healthy.

In this regard, with continuing reference to FIG. 2, the memory 204 contains an error-correcting code (ECC) circuit 214. The ECC circuit 214 is configured to calculate an ECC on data (DIN) 216 to be written to a memory address, which is placed on an address bus 218 in the memory array 208 for a write operation placed on a command bus 219 by the memory controller 206. The ECC is written to the memory array 208 associated with the memory address on the address bus 218. The memory data scrubber circuit 202 in FIG. 2 is provided with the capability of reading data from memory addresses in the memory array 208, calculating an ECC on the read data, and writing corrected data back to the same memory addresses in the memory array 208. The memory data scrubber circuit 202 can provide a memory address and read operation request on an internal command/memory address bus (icmd/iaddr) 220 to be selectively provided by a memory address selector circuit 222 to the memory array 208 to read data stored at the memory address in the memory array 208. The read data and associated ECC is provided as a data output (DOUT) 224 to the memory controller 206 and the memory data scrubber circuit 202. The ECC circuit 214 determines if the read data from the memory array 208 contains an error and provides a correction error signal (cor_er) 227 to the memory data scrubber circuit 202 indicative of whether an error was detected in the data read from the memory array 208. The memory data scrubber circuit 202 can then selectively write the corrected data on an internal data input bus (idin) 226, if correction is needed, back to the read operation memory address in the memory array 208 based on receiving the correction error signal 227 from the ECC circuit 214. The corrected data is selectively provided by a data input selector circuit 228 to the ECC circuit 214 so that the ECC for the corrected data is calculated and written into the memory array 208 associated with the memory address of the corrected data, similar to data provided by the memory controller 206 to be written into the memory array 208.

With continuing reference to FIG. 2, in this example, the memory data scrubber circuit 202 is not provided as part of the memory controller 206. The memory data scrubber circuit 202 is provided outside of the memory controller 206 in the memory system 200. Thus, the memory data scrubber circuit 202 can perform memory data scrubbing operations in the memory array 208 in response to receiving the power-up signal 210 independent of the memory controller 206. The memory controller 206 can enter a powered-down state before or during memory data scrubbing operations being performed by the memory data scrubber circuit 202 in the memory array 208. In this manner, power is further conserved in the memory system 200 in FIG. 2, because the memory controller 206 does not have to be powered on for the memory data scrubbing operations to be performed in the memory array 208. In this example, the memory data scrubber circuit 202 is provided as part of the memory 204, because the memory array 208 will already be in powered-up state to be able to perform memory transactions in the memory array 208 during memory data scrubbing operations, regardless of whether the memory controller 206 is in a powered-up state.

With continuing reference to FIG. 2, exemplary internal components provided in the memory data scrubber circuit 202 are also shown in FIG. 2. In this regard, the memory data scrubber circuit 202 contains control logic 230 that performs the memory data scrubbing operations. The control logic 230 receives the power-up signal 210 from the memory controller 206 to identify when the memory controller 206 is in a powered-up state, and to then initiate memory data scrubbing operations. As will be discussed in more detail below, the control logic 230 may initiate memory data scrubbing operations to the memory 204 with regard to the memory transactions requested to the memory 204 by the memory controller 206. Alternatively, the control logic 230 may base its memory data scrubbing operations to the memory 204 additionally on the memory addresses of the memory transactions requested by the memory controller 206. For example, as discussed in more detail below, it may be desired for the memory data scrubber circuit 202 to skip a memory data scrubbing operation at a particular memory address in the memory array 208 if the memory controller 206 is already performing a write operation to the same next memory address in the memory array 208 stored in the next scrubbing memory address 213 in the memory array 208.

With continuing reference to FIG. 2, the memory data scrubber circuit 202 may also include one or more scrubbing queues 232 to store memory transactions requested by the memory controller 206 as part of the memory data scrubbing operations, as will be discussed in more detail below. The scrubbing queues 232 are configured to store a memory address (addr) for an indicated write operation (wr) and/or read operation (rd). The scrubbing queues 232 are also configured to store the data output 224 from a read operation performed in the memory array 208. The control logic 230 is configured to initiate a memory data scrubbing operation by generating a scrub signal 234 to a scrub generator 236. The scrub generator 236 performs the memory data scrubbing operation based on the next scrubbing memory address 213 received on the data output 224 from the memory array 208. The memory transactions requested by the memory controller 206 that can be stored in the scrubbing queues 232 are provided to the scrub generator 236 as scrub data 238 (qout). The scrub generator 236 can provide the memory address on the internal command/memory address bus (icmd/iaddr) 220 for the corrected data to be written back to the memory array 208 as part of the memory data scrubbing operation. When the memory data scrubbing circuit 202 completes a memory data scrubbing operation in the memory array 208, the memory data scrubbing circuit 202 can provide a scrub done signal 240 to indicate to the memory controller 206 that the memory data scrubbing operation is completed for the particular wake-up period. In this manner, the memory controller 206 can generate a powered-up state in the wake-up signal 210 at its next wake-up period.

Figure 4:
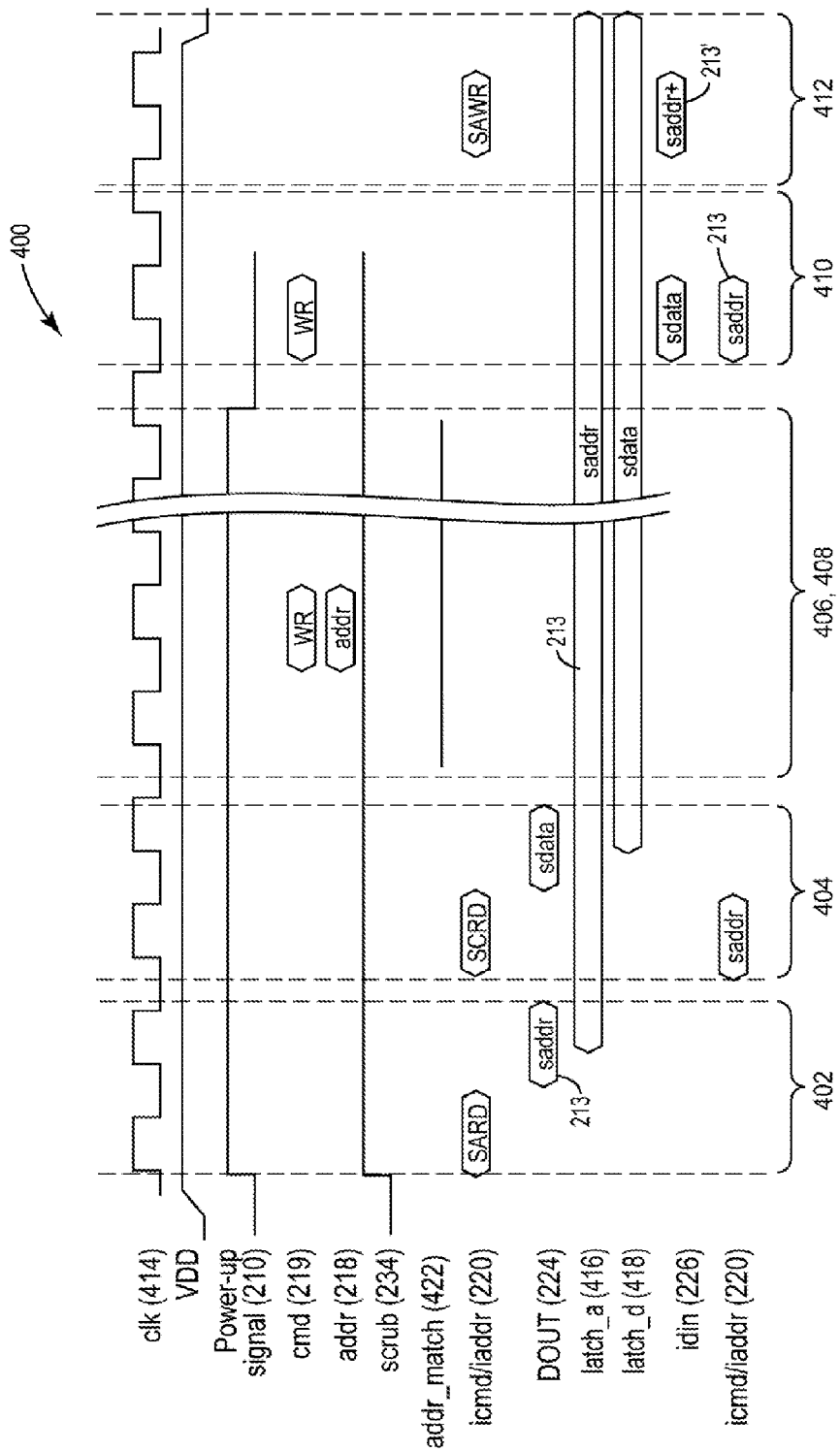
FIG. 4 is an exemplary signal timing diagram for the memory system in FIG. 2 illustrating the memory data scrubber circuit scrubbing memory data stored at a memory address(es) in memory, in response to a powered-up state of the memory controller during a processor idle period.

To provide additional explanation of the memory data scrubbing operations that can be performed by the memory data scrubber circuit 202 of FIG. 2, FIG. 4 is provided. FIG. 4 is an exemplary signal timing diagram 400 for the memory system 200 in FIG. 2 illustrating the memory data scrubber circuit 202 scrubbing memory data stored at a memory address(es) in the memory array 208, in response to a powered-up state of the memory controller 206 during a processor idle period. The signal timing diagram 400 in FIG. 4 will be discussed below in conjunction with the flowchart in FIG. 5 illustrating an exemplary process 500 of the memory data scrubber circuit 202 in FIG. 2 scrubbing memory data stored at a memory address(es) in the memory array 208, in response to a powered-up state of the memory controller 206 during a processor idle period.

In this regard, with reference to FIG. 4, a clock signal 414 is provided that clocks the operation of the circuits in the memory system 200. A power signal (Vdd) provides power to the circuits in the memory system 200. When the memory controller 206 wakes-up during a processor idle time, the memory controller 206 generates the power-up signal 210 (block 402). In this example, a higher signal level indicates a powered-up state of the memory controller 206. The power-up signal 210 transitions from a lower signal level to a higher signal level in this example when the memory controller 206 wakes up to the powered-up state. In response to the indication of the powered-up state in the power-up signal 210 (e.g., on the rising edge of the power-up signal 210) (block 502 in FIG. 5), the scrub signal 234 is generated by the control logic 230 of the memory data scrubber circuit 202 to initiate a memory data scrubbing operation in the memory array 208 (block 402). A read request (SARD) to read from the next scrubbing memory address 213 is placed on the internal command/memory address bus (icmd/iaddr) 220 to be read out from the memory array 208 or other non-volatile (NV) latch (block 402 in FIG. 4, block 504 in FIG. 5). The next scrubbing memory address 213 is received by the memory data scrubber circuit 202 on the data output 224 as "saddr" (block 402 in FIG. 4, block 506 in FIG. 5). The memory data scrubber circuit 202 stores the next scrubbing memory address 213 (saddr) in a latch 416 (latch_a) in the scrubbing queue 232 (block 402).

Next, with continuing reference to FIG. 4, data is read from the memory address of the next scrubbing memory address 213 in the memory array 208 (block 404). In this regard, a read data command (SCRD) is placed on the internal command/memory address bus (icmd/iaddr) 220, and the next scrubbing memory address 213 (saddr) is provided as the memory address on the internal command/memory address bus (icmd/iaddr) 220 (block 404). The data read at the next scrubbing memory address 213 (saddr) from the memory array 208 is stored in another latch (latch_d) 418 in the scrubbing queues 232 (block 404 in FIG. 4, block 506 in FIG. 5). Next, the normal operation of the memory controller 206 is begun, which can include read and/or write commands to the memory array 208 (block 406 in FIG. 4, block 508 in FIG. 5). For example, as shown in block 406 in FIG. 4, the memory controller 206 performs a write operation by placing a write command (WR) onto the command bus 219, and the memory address (addr) for the write command (WR) onto the address bus 218.

Figure 5:
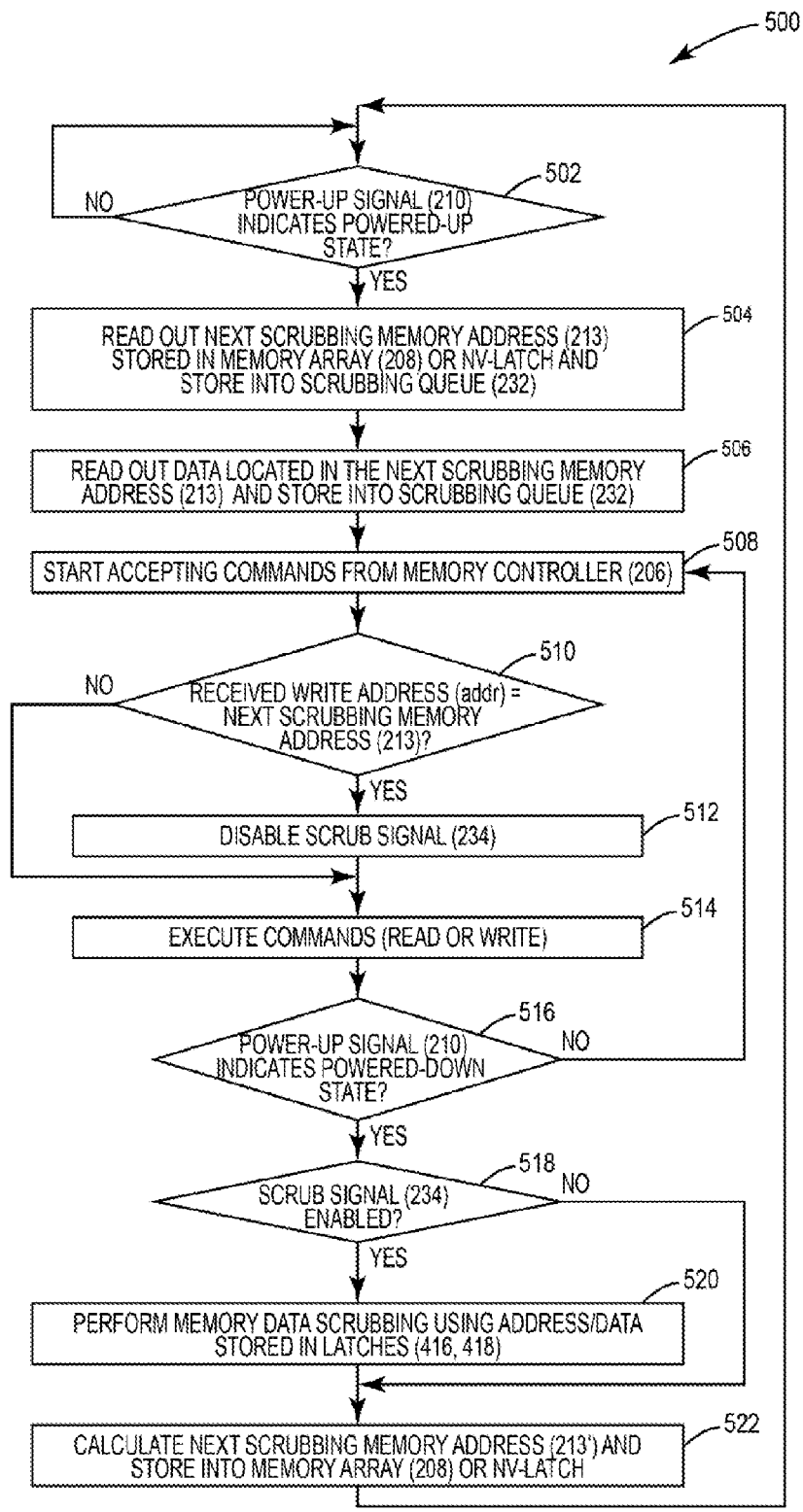
FIG. 5 is a flowchart illustrating an exemplary process of the memory data scrubber circuit in FIG. 2 scrubbing memory data stored at a memory address(es) in memory, in response to a powered-up state of the memory controller during an processor idle period.

Next, with continuing reference to FIG. 4, the control logic 230 of the memory data scrubber circuit 202 determines if the memory address (addr) of the write command (WR) issued by the memory controller 206 in block 406 is the same memory address as stored in the latch (latch_a) 416 as the next scrubbing memory address 213 (block 510 in FIG. 5). If the memory address (addr) of the write command (WR) issued by the memory controller 206 in block 406 is the same memory address for the next scrubbing memory address 213, there is no need to write the corrected data (sdata) to the memory array 208 since the memory controller 206 overwrites the next scrubbing memory address (saddr) 213 with new data (sdata). The memory data scrubbing operation can be skipped by asserting a disable condition on the scrub signal 234 indicating to skip the memory data scrubbing operation (block 512 in FIG. 5). This is shown in the signal timing diagram 600 in FIG. 6, which is the same as the signal timing diagram 400 in FIG. 4, except that a match indicator 420 is asserted on an address match (addr_match) line 422, which causes the scrub signal 234 to be de-asserted to disable the memory data scrubbing operation in block 408. However, if the memory address (addr) of the write command (WR) issued by the memory controller 206 in block 406 is not the same memory address for the next scrubbing memory address 213, the scrub signal 234 is left asserted to keep the memory data scrubbing operation enabled, as shown in block 408 of FIG. 4. The memory array 208 continues to accept memory access request commands from the memory controller 206 until the memory controller 206 enters a powered-down state (blocks 508-514 in FIG. 5).

With continuing reference to FIG. 4, the write command (WR) requested by the memory controller 206 is performed to perform memory data scrubbing if not disabled (block 410 in FIG. 4, block 514 in FIG. 5). Once the power-up signal 210 indicates a powered-down state of the memory controller 206 (block 516 in FIG. 5), the memory data scrubbing operations are performed by the memory data scrubber circuit 202 for the data (sdata) read in the latch (latch_d) 418 at the next scrubbing memory address 213 in the latch (latch_a) 416 (block 410 in FIG. 4, block 520 in FIG. 5) if the memory data scrubbing is not determined to be skipped based on the scrub signal 234 indicating to enable the memory data scrubbing operation (block 516 in FIG. 5). The corrected data (sdata) is placed on the internal data input bus 226 (block 410) to be stored at the memory address of the next scrubbing memory address (saddr) 213 in the memory array 208. The next scrubbing memory address 213 is incremented as "saddr+" to a next scrubbing memory address 213' and placed on the internal data input bus 226. A scrub operation write command (SAWR) is issued on the internal command/memory address bus (icmd/iaddr) 220 to write the next scrubbing memory address 213' back to the memory array 208 for the next memory data scrubbing operation performed at the next wake-up of the memory controller 206 (block 412 in FIG. 4, block 522 in FIG. 5).

Figure 7:
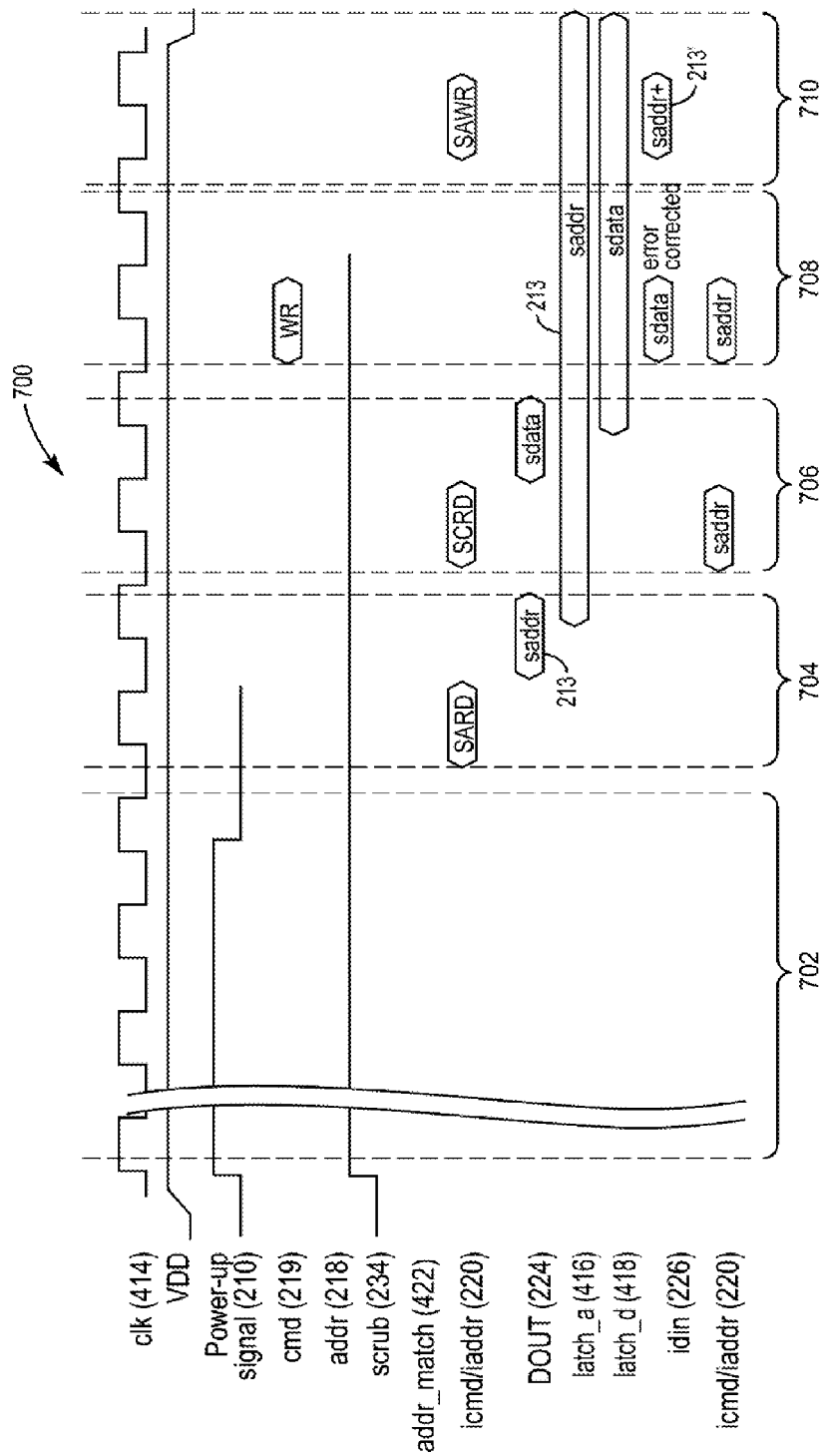
FIG. 7 is an exemplary signal timing diagram for the memory system in FIG. 2 illustrating the memory data scrubber circuit scrubbing memory data stored at a memory address(es) in memory, after the memory controller returns to a powered-down state.
Figure 8:
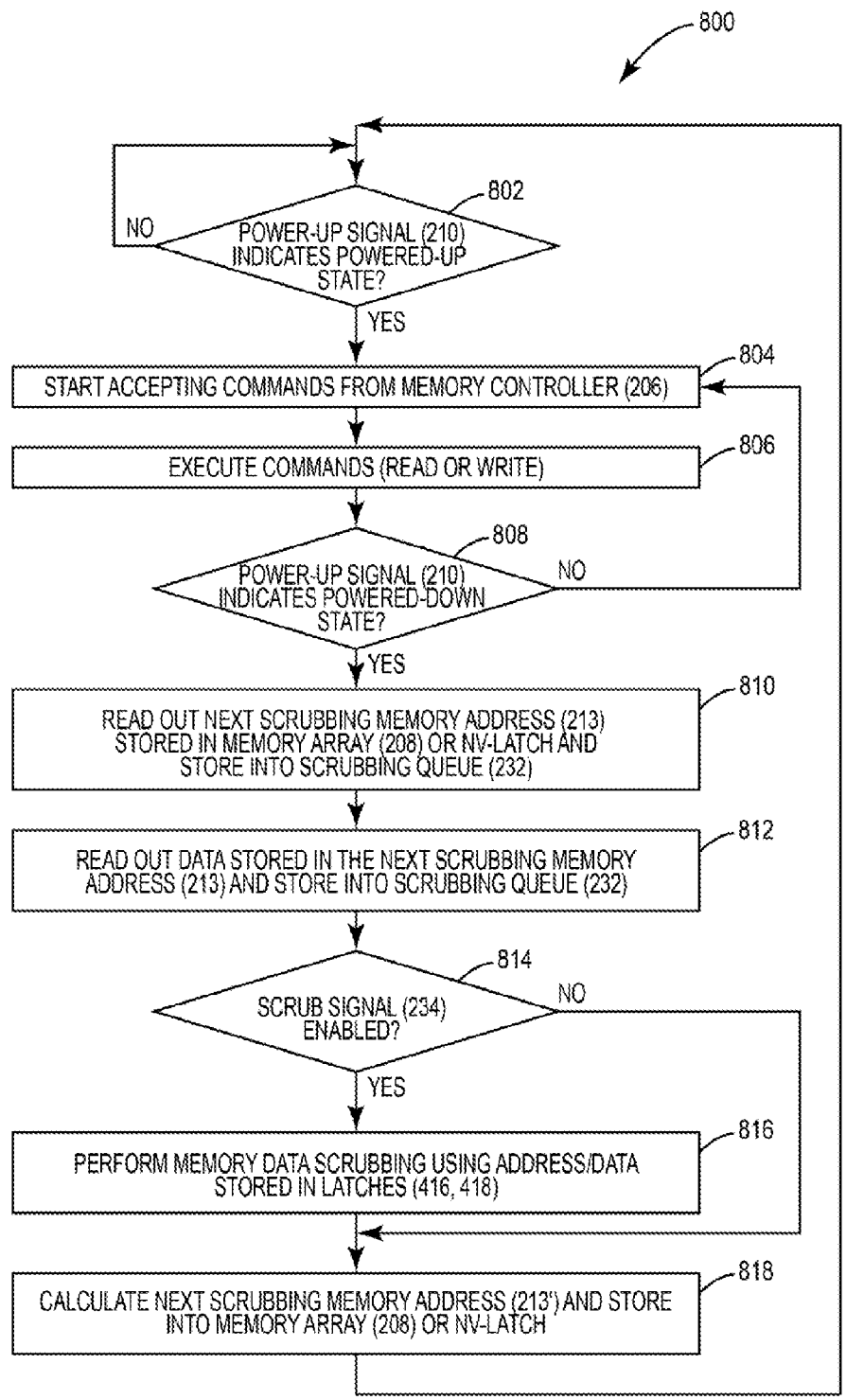
FIG. 8 is a flowchart illustrating an exemplary process of the memory data scrubber circuit in FIG. 2 scrubbing memory data stored at a memory address(es) in memory, after the memory controller returns to a powered-down state.

Alternatively, instead of initiating the memory data scrubbing operations while the memory controller 206 in the memory system 200 in FIG. 2 is in a powered-up state, it may be desired to initiate memory data scrubbing operations after the memory controller 206 has returned to a powered-down state. In this regard, FIG. 7 is an exemplary signal timing diagram 700 for the memory system 200 in FIG. 2 illustrating the memory data scrubber circuit 202 scrubbing memory data in the memory array 208, after the memory controller 206 returns to the powered-down state. FIG. 8 is a flowchart illustrating an exemplary process 800 of the memory data scrubber circuit 202 in FIG. 2 scrubbing memory data stored in the memory array 208, after the memory controller 206 returns to the powered-down state. FIGS. 7 and 8 will be discussed in conjunction below.

With reference to FIG. 7, after the memory controller 206 wakes up during a processor idle state, the memory controller 206 transitions the power-up signal 210 to the powered-up state as previously discussed. However, instead of reading the next scrubbing memory address 213 from the memory array 208, the memory controller 206 performs its normal read and/or write operations to memory 204 fully first (block 702), similar to block 406 in FIG. 4. In response to the power-up signal 210 indicating that the memory controller 206 is in a powered-up state (e.g., a higher signal level) (block 702 in FIG. 7, block 802 in FIG. 8), a scrub signal 234 is generated by the control logic 230 of the memory data scrubber circuit 202 for later initiation of a memory data scrubbing operation in the memory array 208 when the memory controller 206 completes its read and/or write operations. The memory controller 206 requests its read and/or write operations (block 804 in FIG. 8), and executes the commands to perform such read and/or write operations in the memory 204 (block 806 in FIG. 8). When the read and/or write operations requested by the memory controller 206 have been completed, such that the power-up signal 210 indicates a powered-down state of the memory controller 206 (block 808 in FIG. 8), memory data scrubbing operations can then be performed by the memory data scrubber circuit 202.

With continuing reference to FIG. 7, just as provided in block 402 in FIG. 4, a read request (SARD) to read the next scrubbing memory address 213 is placed on the internal command/memory address bus (icmd/iaddr) 220 to be read from the memory array 208 other non-volatile (NV) latch (block 704 in FIG. 7, block 810 in FIG. 8). The next scrubbing memory address 213 is received by the memory data scrubber circuit 202 on the data output 224 as "saddr" (block 704 in FIG. 7, block 810 in FIG. 8). The memory data scrubber circuit 202 stores the next scrubbing memory address 213 (saddr) in a latch 416 (latch_a) in the scrubbing queue 232 (block 704).

Next, with continuing reference to FIG. 7, data is read from the memory address of the next scrubbing memory address 213 in the memory array 208 (block 706), similar to block 404 in FIG. 4. In this regard, a read data command (SCRD) is placed on the internal command/memory address bus (icmd/iaddr) 220, and the next scrubbing memory address 213 (saddr) is provided as the memory address on the internal command/memory address bus (icmd/iaddr) 220 (block 706). The data read at the next scrubbing memory address 213 (saddr) from the memory array 208 is stored in another latch (latch_d) 418 in the scrubbing queues 232 (block 706 in FIG. 7, block 812 in FIG. 8).

Next, with continuing reference to FIG. 7, the control logic 230 of the memory data scrubber circuit 202 performs memory data scrubbing of the data read from the next scrubbing memory address 213 in the memory array 208 if the scrub signal 234 indicates for a memory data scrubbing operation to be performed (block 814 in FIG. 8). The memory data scrubbing operations are performed by the memory data scrubber circuit 202 for the data (sdata) read in the latch (latch_d) 418 at the next scrubbing memory address 213 in the latch (latch_a) 416 (block 708 in FIG. 7, block 816 in FIG. 8), similar to block 410 in FIG. 4. The corrected data (sdata) is placed on the internal data input bus 226 (block 708 in FIG. 7, block 816 in FIG. 8) to be stored at the memory address of the next scrubbing memory address (saddr) 213 in the memory array 208. The next scrubbing memory address 213 is incremented as "saddr+" to a next scrubbing memory address 213' and placed on the internal data input bus 226 (block 710 in FIG. 7, block 818 in FIG. 8). In this regard, a scrubbing operation write command (SAWR) is issued on the internal command/memory address bus (icmd/iaddr) 220 to write the next scrubbing memory address 213' back to the memory array 208 for the next memory data scrubbing operation performed at the next wake-up of the memory controller 206 (block 710 in FIG. 7, block 818 in FIG. 8), similar to block 412 in FIG. 4.

Figure 9:
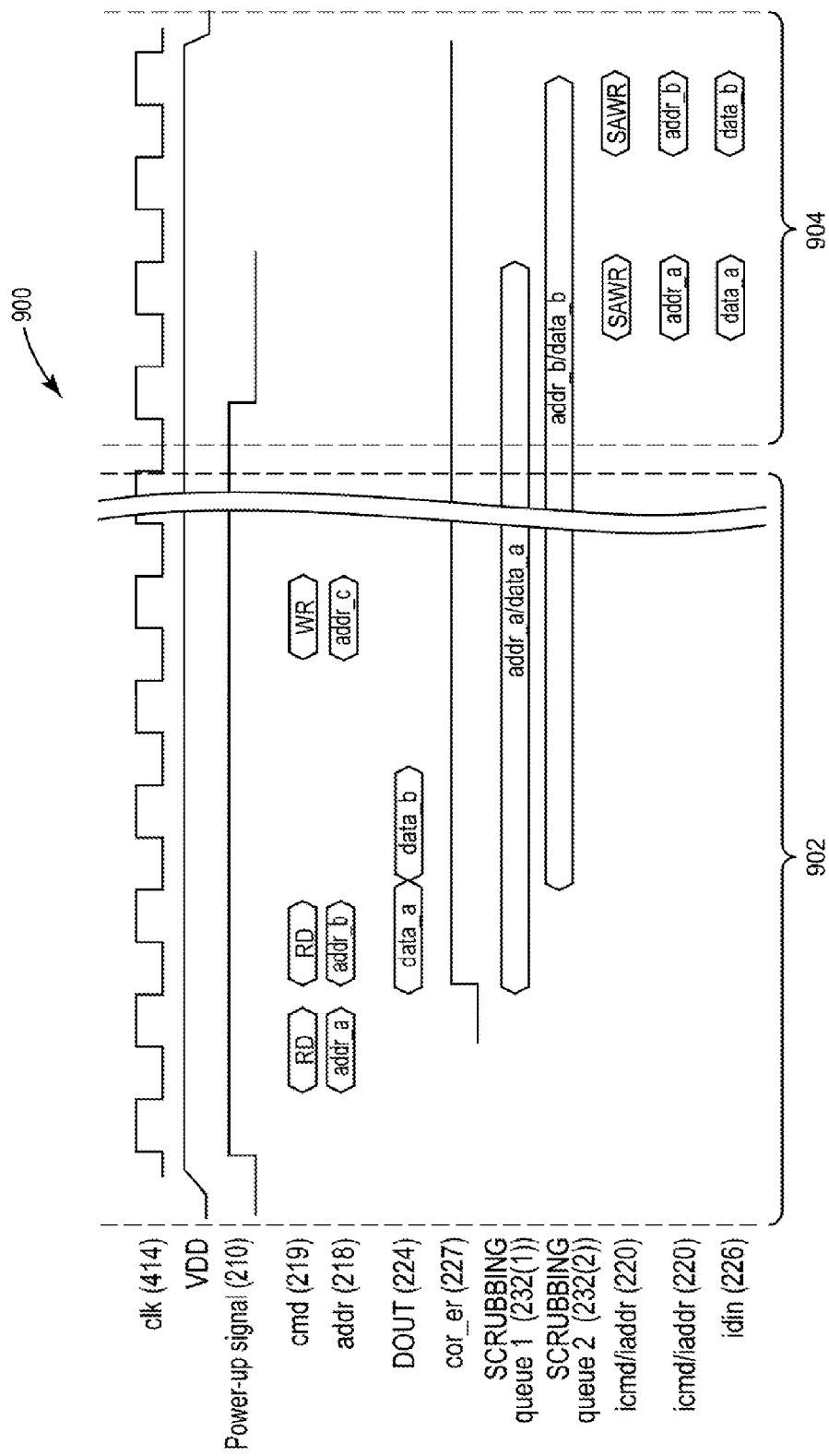
FIG. 9 is an exemplary signal timing diagram for the memory system in FIG. 2 illustrating the memory data scrubber circuit scrubbing memory data stored at a memory address(es) for a read operation performed by the memory controller, when data for the read operation is determined to have an error.
Figure 10:
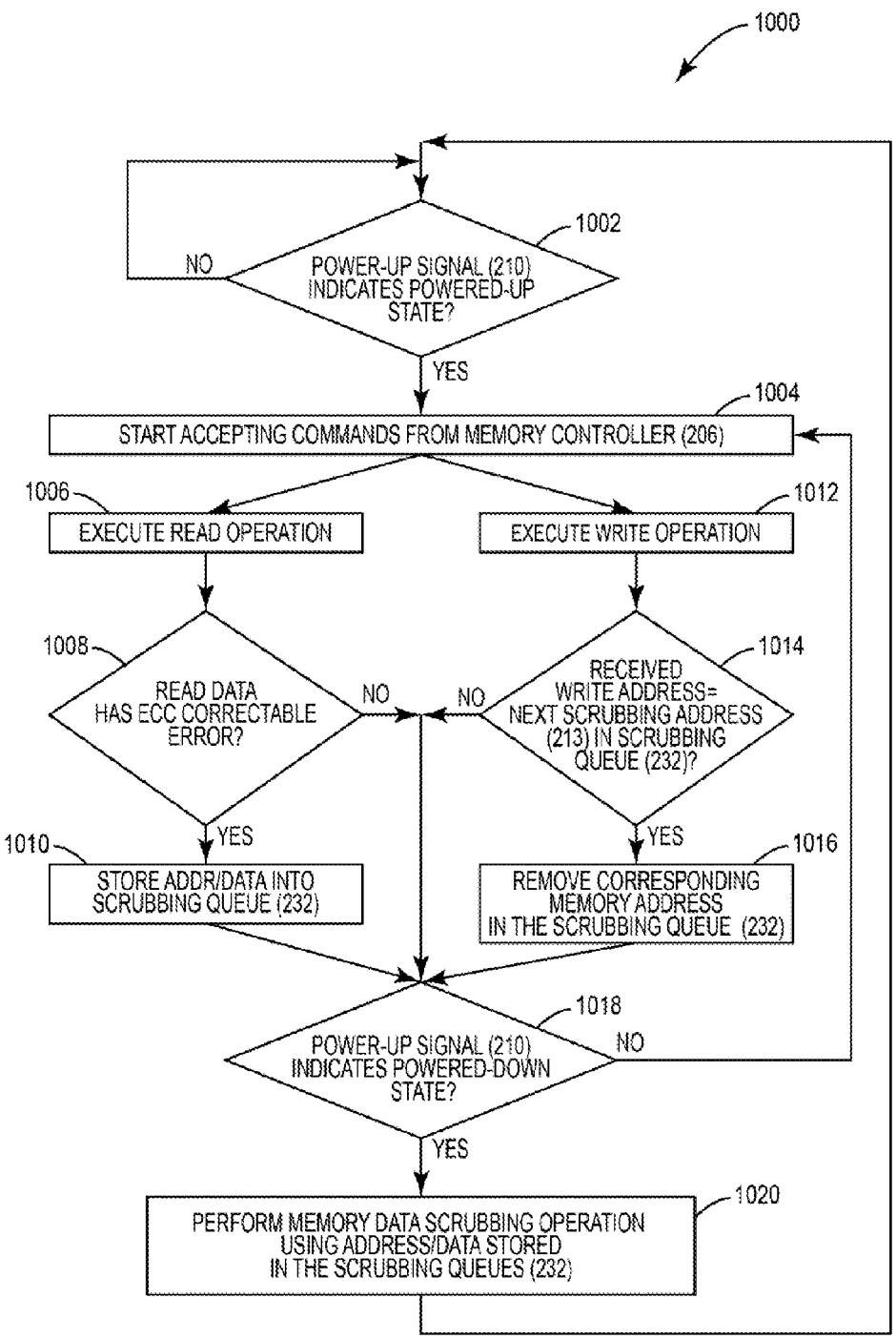
FIG. 10 is a flowchart illustrating an exemplary process of the memory data scrubber circuit in FIG. 2 scrubbing memory data stored at a memory address(es) for a read operation performed by the memory controller, when data for the read operation is determined to have an error.

It may also be desired to provide for the memory data scrubber circuit 202 in the memory system 200 in FIG. 2 to be able to write corrected data to the memory array 208 as part of a memory data scrubbing operation if data read by the memory controller 206 as part of memory transactions performed in the powered-up state contains errors. The memory data scrubber circuit 202 could be configured to write corrected data to the memory array 208 in addition to or in lieu of performing a memory data scrubbing operation on the data stored at the next scrubbing memory address 413. In this regard, FIG. 9 is an exemplary signal timing diagram 900 illustrating the memory data scrubber circuit 202 in the memory system 200 in FIG. 2 being configured to scrub memory data stored at a memory address(es) for a read operation performed by the memory controller 206, when data for the read operation is determined to have an error. FIG. 10 is a flowchart illustrating an exemplary process 1000 of the memory data scrubber circuit 202 scrubbing memory data stored at a memory address(es) for a read operation performed by the memory controller 206, when data for the read operation is determined to have an error. FIGS. 9 and 10 will be discussed in conjunction with each other.

With reference to FIG. 9, after the memory data scrubber circuit 202 determines that the power-up signal 210 indicates a powered-up state (e.g., a higher signal level) (block 1002 in FIG. 10), memory transactions are accepted from the memory controller 206 (block 902 in FIG. 9, block 1004 in FIG. 10). The memory transactions requested by the memory controller 206 may be read or write operations to the memory 204. If the requested memory transaction is a read operation, the read operation is executed by the memory 204 (block 1006 in FIG. 10). For example, in the exemplary signal timing diagram 900 in FIG. 9, the memory controller 206 has requested two read operations by asserting a read command (RD) on the command bus 219 for memory addresses A (addr_a) and B (addr_b) (block 902). The memory 204 provides the data stored in the memory array 208 corresponding to the memory addresses A (addr_a) and B (addr_b) as data A (data_a) and data B (data_b), respectively (block 902). In the exemplary signal timing diagram 900 in FIG. 9, the ECC circuit 214 in FIG. 2 has determined that a data error exists in data A (data_a) and data B (data_b) (block 1008 in FIG. 10). The ECC circuit 214 asserts the correction error signal 227 to indicate to the memory data scrubber circuit 202 that a correctable error exists in data corresponding to a read operation performed at the request of the memory controller 206. In response, the memory data scrubber circuit 202 stores the memory address (addr) and corresponding data (data) stored at the memory address (addr) in the memory array 208 into a scrubbing queue 232 (block 1010 in FIG. 10). In the example in FIG. 9, both the memory address A (addr_a) and corresponding data A (data_a), and memory address B (addr_b) and corresponding data B (data_b) are stored in respective scrubbing queues 232(1), 232(2) in the memory data scrubber circuit 202. This is so that memory address A (addr_a) and corresponding data A (data_a), and memory address B (addr_b) and corresponding data B (data_b) are available during a subsequent memory data scrubbing operation to write corrected data to memory address A (addr_a) and/or memory address B (addr_b) in the memory array 208.

With continuing reference to FIG. 10, if the memory controller 206 requests a write operation, the write operation is executed (block 1012). For example, FIG. 9 illustrates a write command (WR) asserted on the command bus 219 by the memory controller 206 to memory address C (addr_c) in block 902. In this manner, if the write command (WR) memory address matches the memory address stored in the scrubbing queue 232 and has erroneous, correctable data (block 1014 in FIG. 10), such memory address can be removed from the scrubbing queue 232 (block 1016 in FIG. 10). This is because the memory address in the memory array 208 will be overwritten by the memory controller 206, so there is no need for the memory data scrubber circuit 202 to write corrected data previously stored at the memory address in the memory array 208. With reference to FIG. 9, in this example, the write command (WR) is to memory address C (addr_c), which does not match memory address A (addr_a) stored in scrubbing queue 232(1) or memory address B (addr_b) stored in scrubbing queue 232(2).

Next, once the power-up signal 210 is determined to indicate a powered-down state (e.g., a lower signal level) of the memory controller 206 (block 1018 in FIG. 10), memory data scrubbing operations are performed by the memory data scrubber circuit 202 (block 904 in FIG. 9, block 1020 in FIG. 10). With reference to the example in FIG. 9, the memory data scrubber circuit 202 asserts scrub write commands (SAWR) for corrected data A (data_a) to be written to memory address A (addr_a) in the memory array 208, and corrected data B (data_b) to be written to memory address B (addr_b) in the memory array 208 (block 904).

Figure 11:
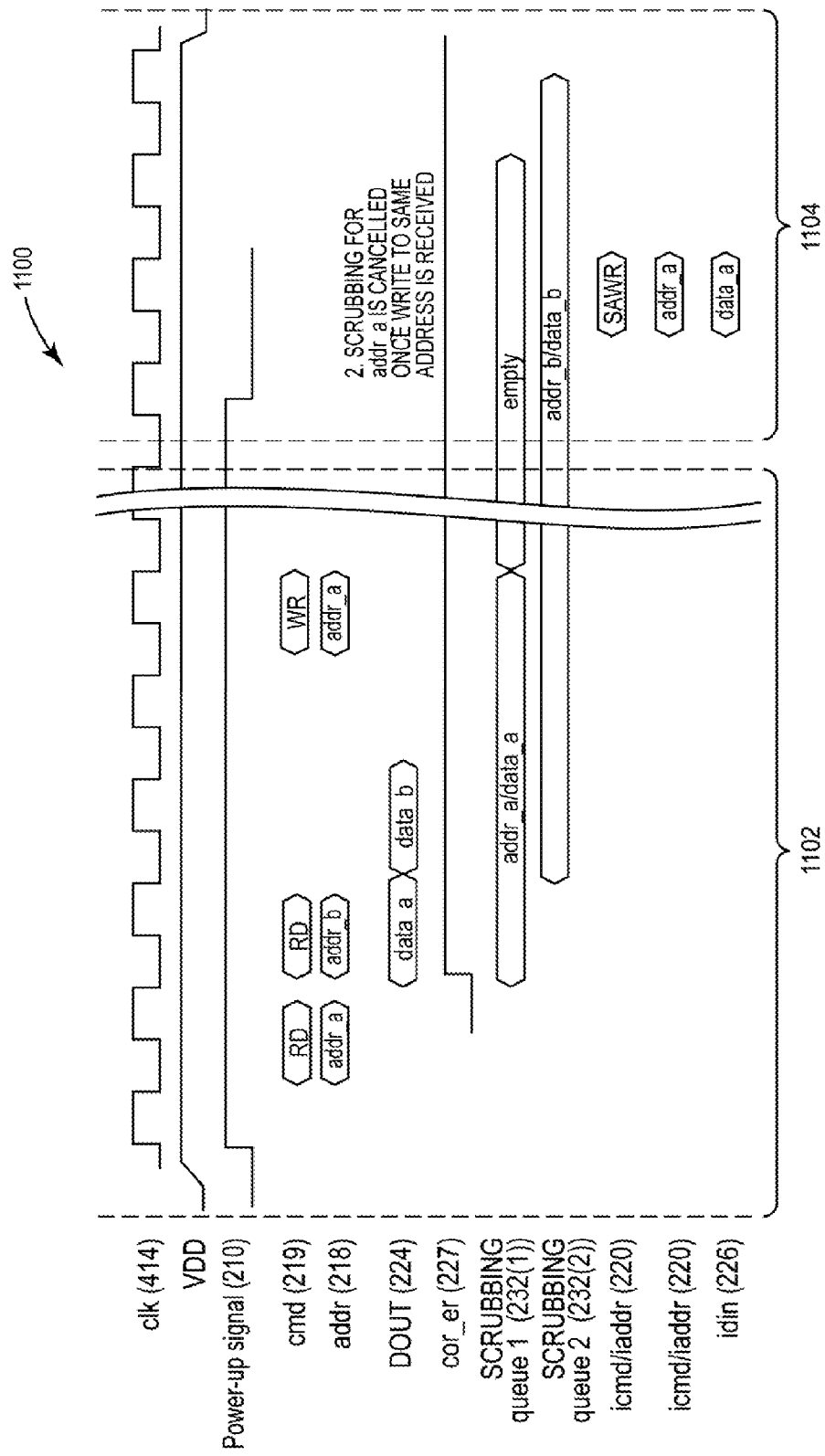
FIG. 11 is an exemplary signal timing diagram for the memory system in FIG. 2 illustrating the memory data scrubber circuit skipping scrubbing of memory data stored at a memory address(es) for a read operation performed by the memory controller, when data for the read operation is determined to have an error, and if the memory controller also performs a write operation at the memory address of the read operation.

FIG. 11 is an exemplary timing diagram 1100 that illustrates the operation of the memory data scrubber circuit 202 of FIG. 2 when the memory address of a write operation requested by the memory controller 206 matches a memory address for a read operation that contains erroneous, correctable data. In this scenario, as provided in block 1016 in FIG. 10, such a memory address containing erroneous, correctable data will be removed from the scrubbing queue 232 since such a memory address will be written. For example, as illustrated in FIG. 11, a write command (WR) asserted by the memory controller 206 is written to memory address A (addr_a) (block 1102 in FIG. 11). Thus, the memory data scrubber circuit 202 will remove memory address A (addr_a) and corresponding data A (data_a) from scrubbing queue 232(1) (block 1102 in FIG. 11) since there is no need for the memory data scrubber circuit 202 to write corrected data to memory address A (addr_a) in the memory array 208. With continued reference to the example in FIG. 11, the memory data scrubber circuit 202 asserts scrub write commands (SAWR) only for corrected data B (data_b) to be written to memory address B (addr_b) in the memory array 208 as part of the memory data scrubbing operation (block 1104 in FIG. 11).

Figure 12:
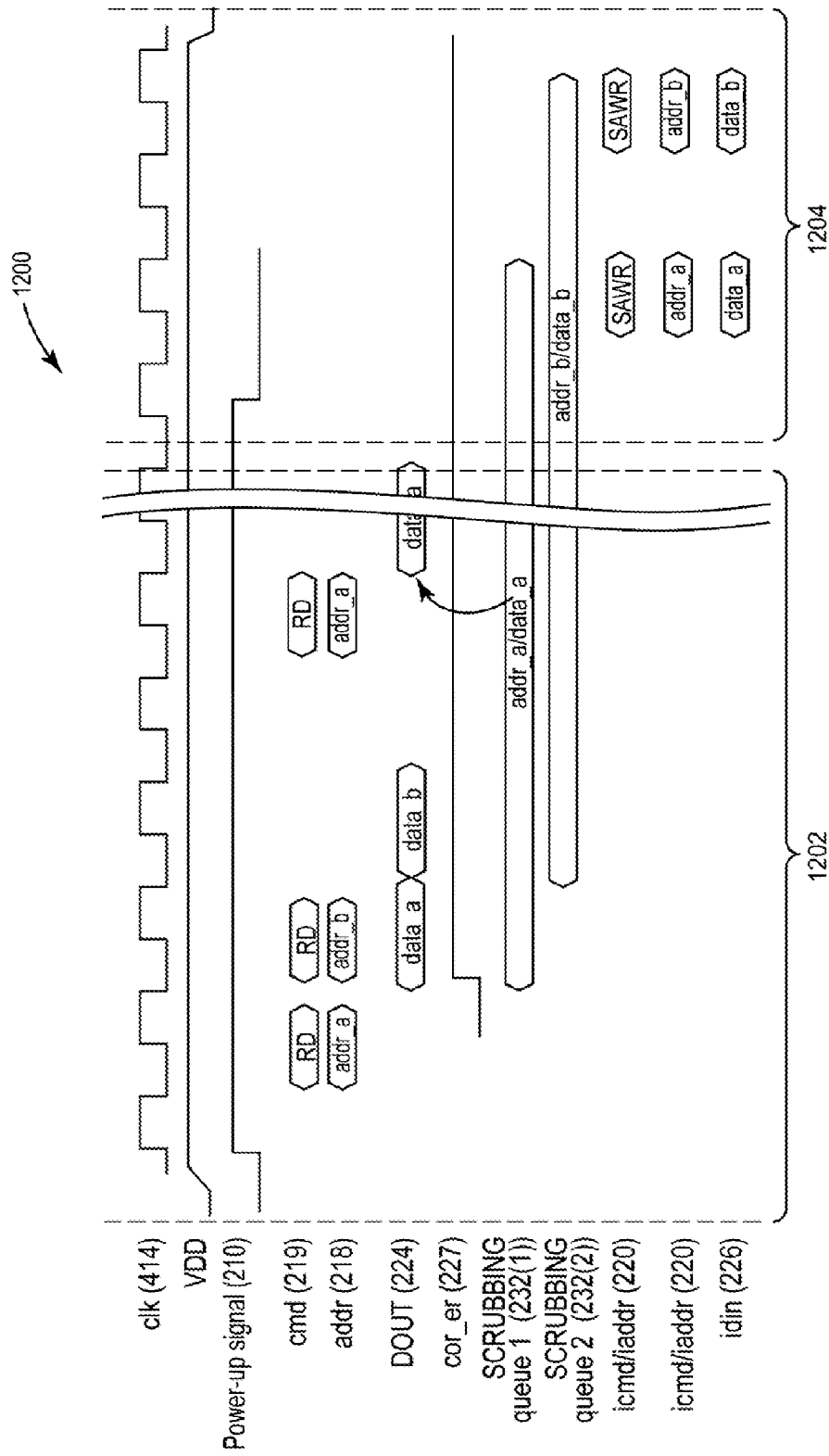
FIG. 12 is another exemplary signal timing diagram for the memory system in FIG. 2 illustrating the memory data scrubber circuit scrubbing memory data stored at a memory address(es) for a read operation performed by the memory controller, when data for the read operation is determined to have an error.

Further, in the example of the process 1000 in FIG. 10 for the memory data scrubber circuit 202, if the memory controller 206 issues two or more read commands to the same memory address in the memory array 208 in block 1004 wherein the first read command is detected as having a correctable error, the memory data scrubber circuit 202 can be configured to not perform the additional read operations. This is because the scrubbing queue 232 will already have stored the memory address and corresponding corrected data making it unnecessary for the additional read command(s) to the same memory address in the memory array 208 to be executed. The memory data scrubber circuit 202 can be configured to provide the stored data in the scrubbing queue 232 onto the data output 224. This is shown in the exemplary timing diagram 1200 in FIG. 12, where a second read command (RD) is asserted on the command bus 219 by the memory controller 208 again to memory address A (addr_a) (block 1202). In this example, the memory data scrubber circuit 202 can place the data A (data_a) previously read from memory address A (addr_a) onto the data output 224. As previously discussed above, once the power-up signal 210 indicates a powered-down state (e.g., a lower signal level) (block 1018) in FIG. 10, the memory data scrubber circuit 202 asserts scrub write commands (SAWR) for corrected data A (data_a) to be written to memory address A (addr_a) in the memory array 208, and corrected data B (data_b) to be written to memory address B (addr_b) in the memory array 208 (block 1204 in FIG. 12).

Figure 6:
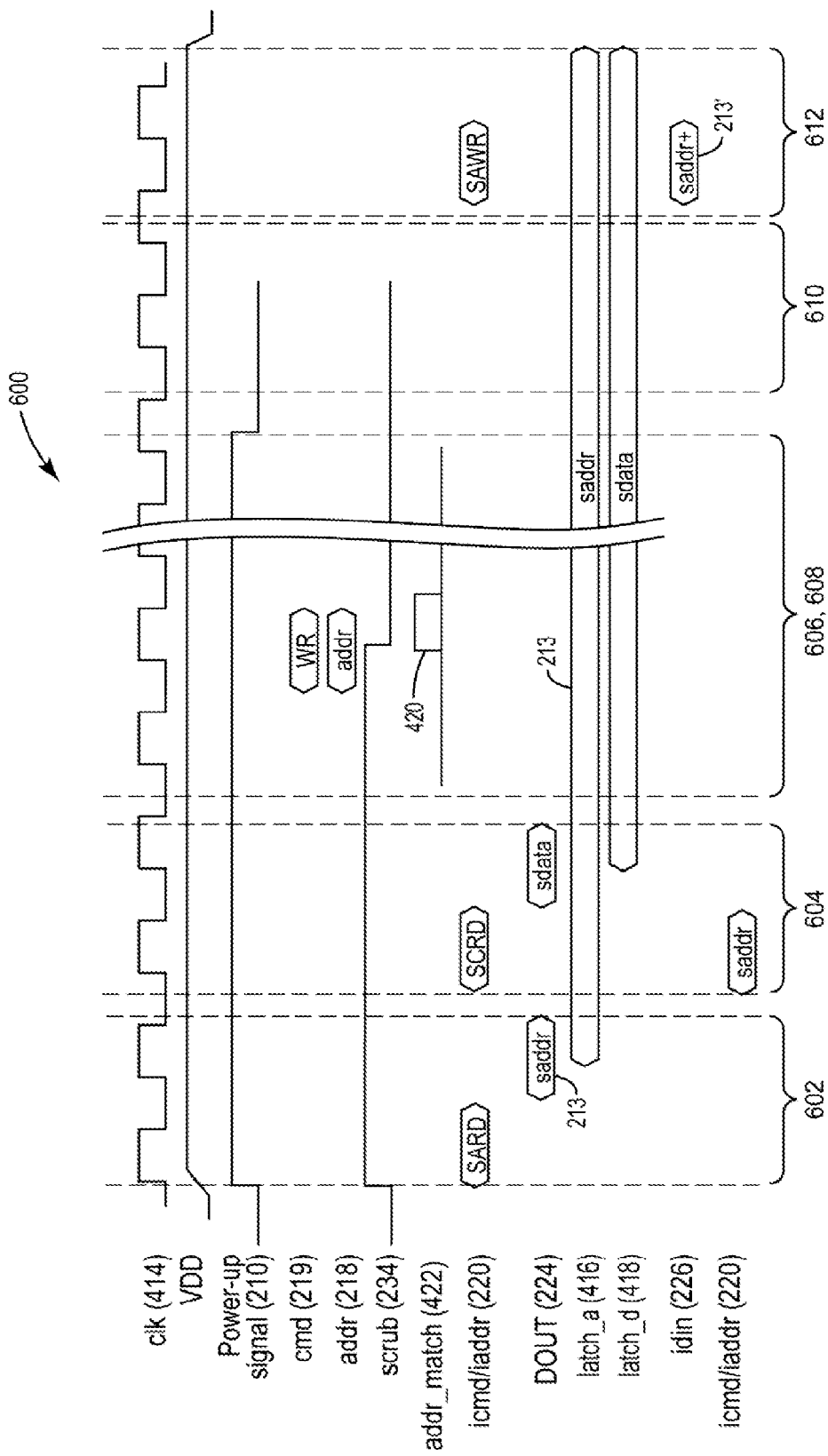
FIG. 6 is an exemplary signal timing diagram for the memory system in FIG. 2 illustrating the memory data scrubber circuit skipping the scrubbing of memory data stored at a memory address(es) in memory, when the memory address of a write operation from the memory controller matches a next scrubbing memory address to be data scrubbed in the memory.
Figure 13:
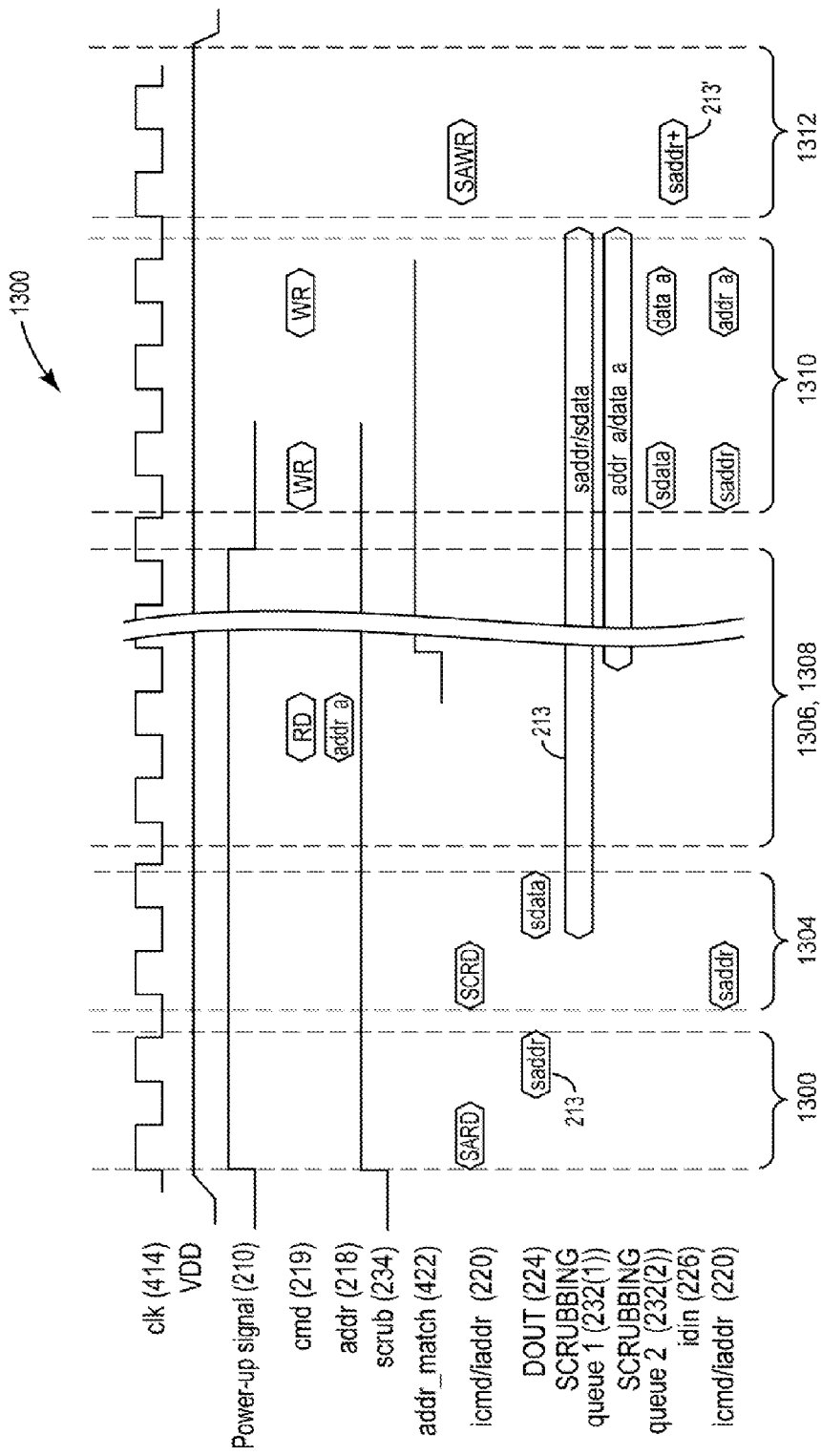
FIG. 13 is an exemplary signal timing diagram for the memory system in FIG. 2 illustrating the memory data scrubber circuit scrubbing memory data stored at a memory address(es) for a read operation performed by the memory controller, when data for the read operation is determined to have an error, and the memory data scrubber circuit scrubbing the erroneous memory data stored at the memory address(es)
Figure 14:
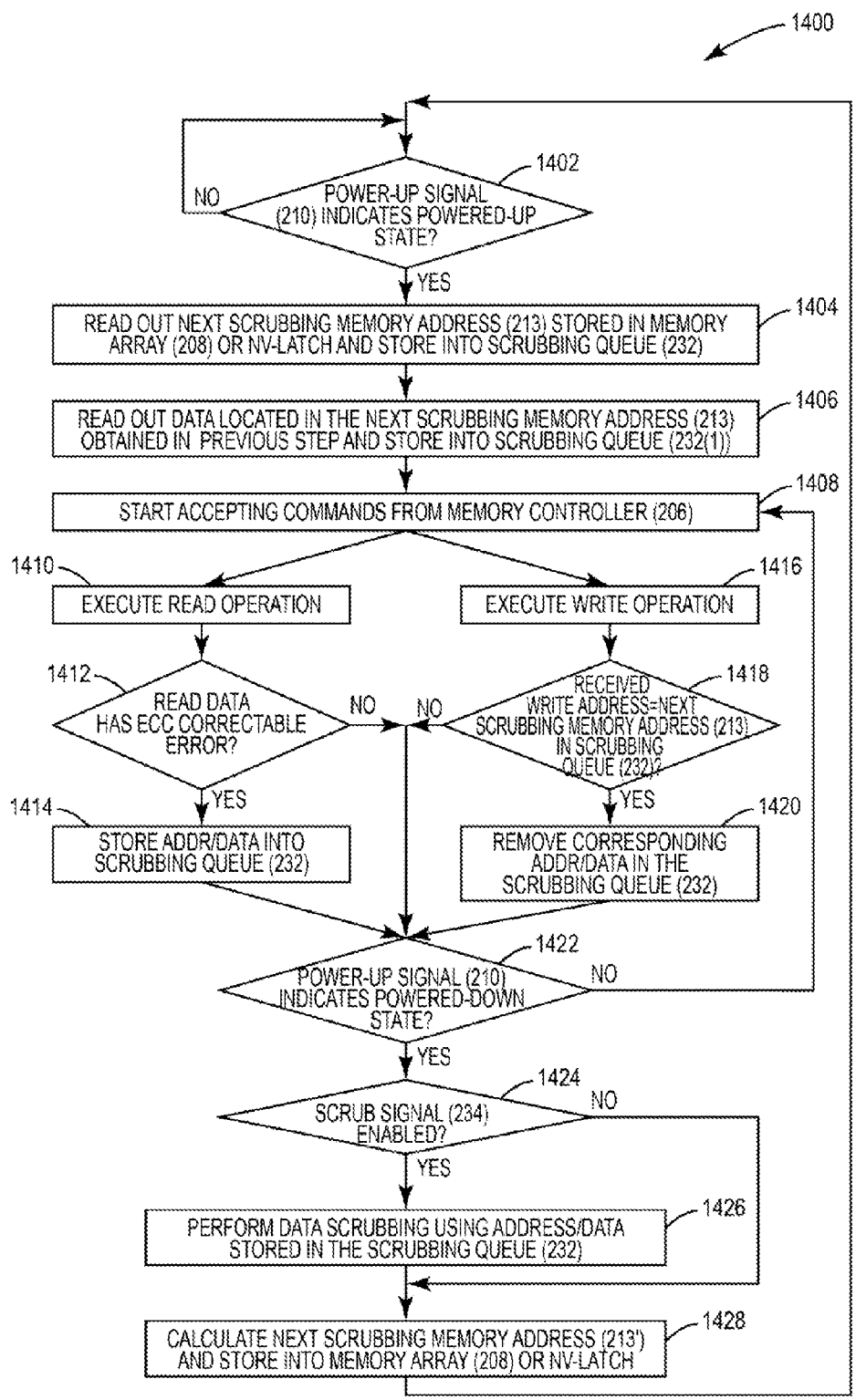
FIG. 14 is a flowchart illustrating an exemplary process of the memory data scrubber circuit in FIG. 2 scrubbing memory data according to the exemplary signal timing diagram in FIG. 13.

It may be desired to configure the memory data scrubber circuit 202 in the memory system 200 in FIG. 2 to be able to write corrected data to the memory array 208 as part of a memory data scrubbing operation as provided in the examples in FIGS. 9-12 above, but also initiate memory data scrubbing operations in response to receipt of the power-up signal 210 indicating a powered-up state (e.g., a higher signal level) of the memory controller 206 as provided in the examples in FIGS. 4-6. In this regard, FIG. 13 illustrates an exemplary signal timing diagram 1300 for the memory data scrubber circuit 202 performing this functionality. FIG. 14 is a flowchart illustrating an exemplary process 1400 for the memory data scrubber circuit 202 in the memory system 200 in FIG. 2 to be able to write corrected data to the memory array 208 as part of a memory data scrubbing operation as provided in the examples in FIGS. 9-12 above, but also initiate memory data scrubbing operations in response to receipt of the power-up signal 210 indicating a powered-up state (e.g., a higher signal level) of the memory controller 206 as provided in the examples in FIGS. 4-6. FIGS. 13 and 14 will be discussed in conjunction with each other.

In this regard, with reference to FIG. 13, the memory data scrubber circuit 202 can be configured to perform blocks 1302-1304 just as blocks 402-404, respectively, as shown in the signal timing diagram 400 in FIG. 4. In this regard, in response to the power-up signal 210 indicating a powered-up state (e.g., a higher signal level) of the memory controller 206 (block 1402 in FIG. 14), a scrub signal 234 is generated by the control logic 230 of the memory data scrubber circuit 202 to initiate a memory data scrubbing operation in the memory array 208 (block 1302). A read request (SARD) to read the next scrubbing memory address 213 is placed on the internal command/memory address bus (icmd/iaddr) 220 to be read from the memory array 208 other non-volatile (NV) latch (block 1302 in FIG. 13, block 1404 in FIG. 14). The next scrubbing memory address 213 is received by the memory data scrubber circuit 202 on the data output 224 as "saddr" (block 1302 in FIG. 13, block 1406 in FIG. 14).

Next, with continuing reference to FIG. 13, data is read from the memory address of the next scrubbing memory address 213 in the memory array 208 (block 1304). In this regard, a read data command (SCRD) is placed on the internal command/memory address bus (icmd/iaddr) 220, and the next scrubbing memory address 213 (saddr) is provided as the memory address on the internal command/memory address bus (icmd/iaddr) 220 (block 1304). The data read at the next scrubbing memory address 213 (saddr) from the memory array 208 is stored in scrubbing queue 232(1) (block 1304 in FIG. 13, block 1406 in FIG. 14). Next, the normal operation of the memory controller 206 is performed, which can include read and/or write operations to the memory array 208 (block 1306 in FIG. 13, block 1408 in FIG. 14). For example, as shown in block 1306 in FIG. 13, the memory controller 206 performs a read operation by asserting a read command (RD) onto the command bus 219 for memory address A (addr_a) (block 1410 in FIG. 14). The memory 204 provides the data stored in the memory array 208 corresponding to memory address A (addr_a) as data A (data_a) respectively (block 1306).

In the exemplary signal timing diagram 1300 in FIG. 13, the ECC circuit 214 in FIG. 2 has determined that a data error exists in data A (data_a) (block 1412 in FIG. 14). The ECC circuit 214 asserts the correction error signal 227 to indicate to the memory data scrubber circuit 202 that a correctable error exists in data corresponding to a read command performed at the request of the memory controller 206. In response, the memory data scrubber circuit 202 stores the memory address (addr) and corresponding data (data) stored at the memory address (addr) in the memory array 208 into a scrubbing queue 232 (block 1304 in FIG.

13, block 1414 in FIG. 14). In the example in FIG. 13, the memory address A (addr_a) and corresponding data A (data_a), are stored in scrubbing queue 232(2) in the memory data scrubber circuit 202. This is so that memory address A (addr_a) and corresponding data A (data_a) are available during a subsequent memory data scrubbing operation to write corrected data to memory address A (addr_a) in the memory array 208. Scrubbing queue 232(1) contains the next scrubbing memory address 213, so scrubbing queue 232(2) is used to store the memory address A (addr_a) and corresponding data A (data_a).

With continuing reference to FIG. 14, if the memory controller 206 requests a write operation, the write operation is executed (block 1416 in FIG. 14). In this manner, if the write operation memory address matches the memory address stored in the scrubbing queue 232 and has erroneous, correctable data (block 1418 in FIG. 14), such memory address can be removed from the scrubbing queue 232 (block 1420 in FIG. 14). This is because the memory address in the memory array 208 will be overwritten by the memory controller 206, so there is no need for the memory data scrubber circuit 202 to write corrected data previously stored at the memory address in the memory array 208.

Next, once the power-up signal 210 is determined to indicate a powered-down state (e.g., a lower signal level) of the memory controller 206 (block 1422 in FIG. 14), memory data scrubbing operations are performed by the memory data scrubber circuit 202 (block 1310 in FIG. 13, block 1426 in FIG. 14) if the scrub signal 234 is asserted (block 1310 in FIG. 13, block 1424 in FIG. 14). With reference to the example in FIG. 13, the memory data scrubber circuit 202 asserts a write command (WR) for corrected data A (data_a) to be written to memory address A (addr_a) stored in scrubbing queue 232(2) in the memory array 208 (block 1310 in FIG. 13, block 1426 in FIG. 14). The memory data scrubber circuit 202 also issues a write command (WR) to the write corrected data (sdata) for the next scrubbing memory address 213 stored in scrubbing queue 232(1) to be written to the next scrubbing memory address 213 in the memory array 208 (block 1310 in FIG. 13, block 1426 in FIG. 14). The next scrubbing memory address 213 is incremented as "saddr+" to a next scrubbing memory address 213' and placed on the internal data input bus 226 (block 1312 in FIG. 13, block 1428 in FIG. 14). A scrub operation write command (SAWR) is issued on the internal command/memory address bus (icmd/iaddr) 220 to write the next scrubbing memory address 213' to the memory array 208 for the next memory data scrubbing operation performed at the next wake-up of the memory controller 206 (block 1312 in FIG. 13, block 1428 in FIG. 14).

Figure 15:
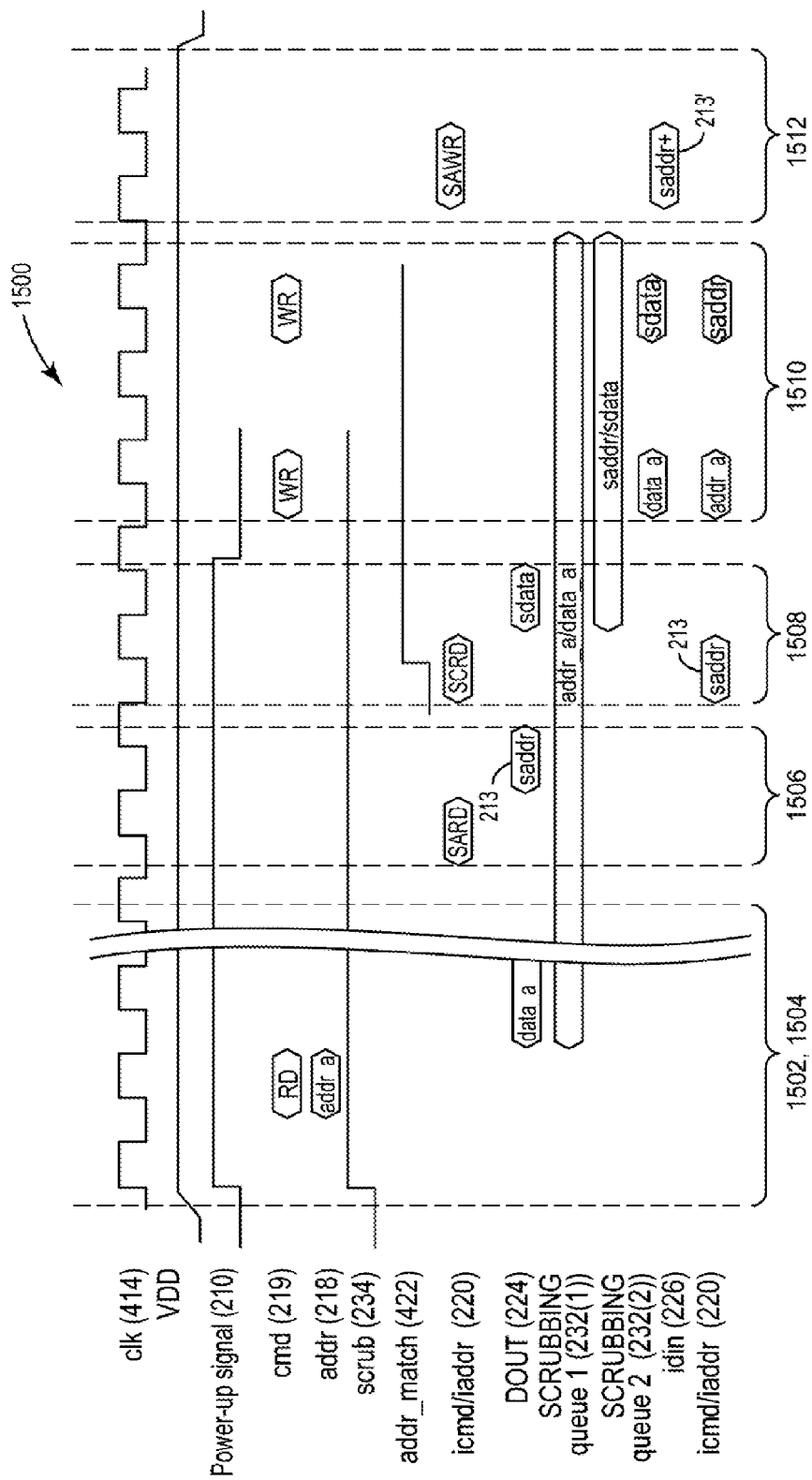
FIG. 15 is an exemplary signal timing diagram for the memory system in FIG. 2 illustrating the memory data scrubber circuit scrubbing memory data stored at a memory address(es) for a read operation performed by the memory controller, when data for the read operation is determined to have an error, and after the memory controller is powered down.
Figure 16:
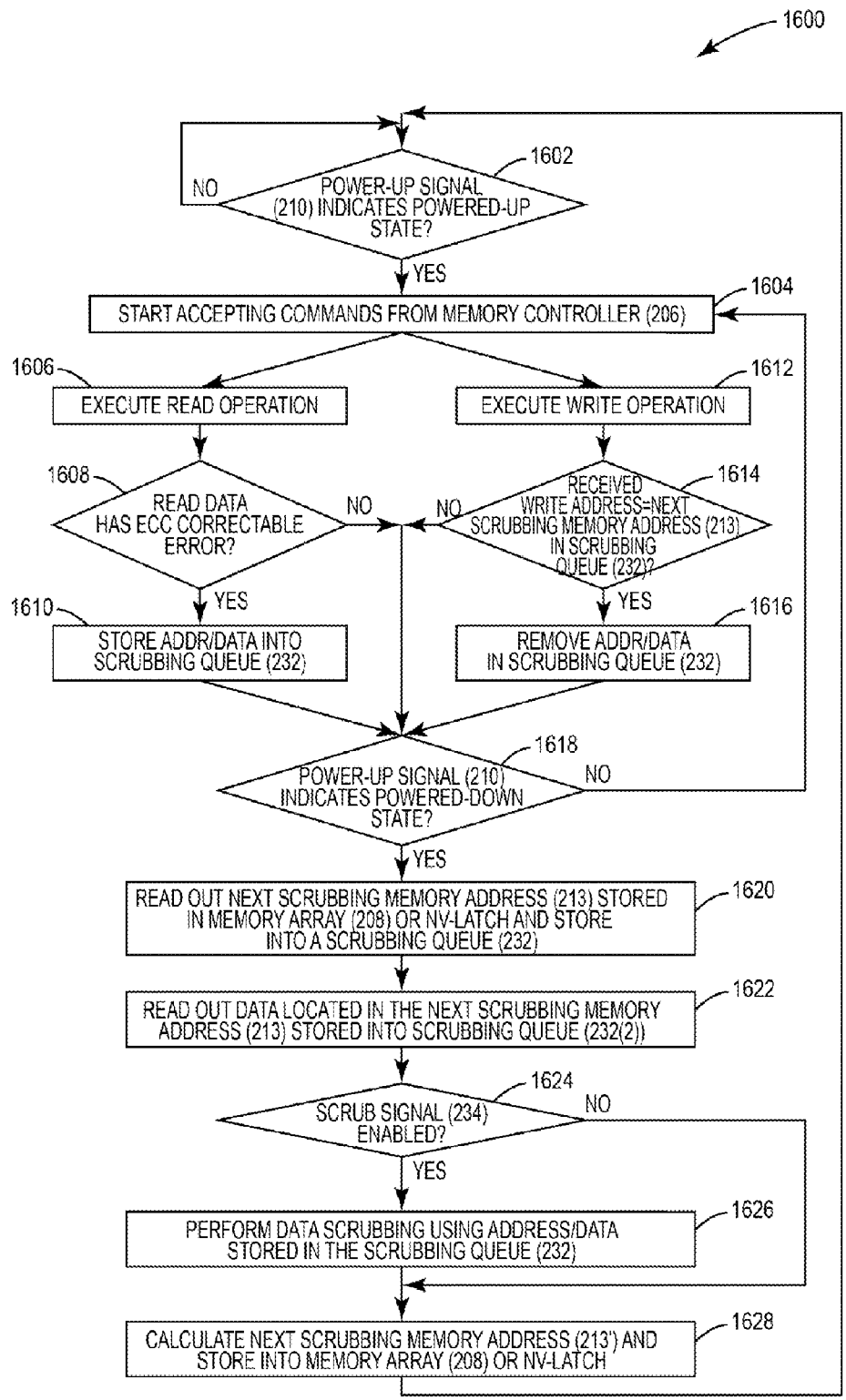
FIG. 16 is a flowchart illustrating an exemplary process of the memory data scrubber circuit in FIG. 2 scrubbing memory data according to the exemplary signal timing diagram in FIG. 15.

It may also be desired to configure the memory data scrubber circuit 202 in the memory system 200 in FIG. 2 to be able to write corrected data to the memory array 208 as part of a memory data scrubbing operation as provided in the examples in FIGS. 9-12 above, but wait to initiate memory data scrubbing operations in response to receipt of the power-up signal 210 until the memory controller 206 is in a powered-down state as provided in the examples in FIGS. 7 and 8. In this regard, FIG. 15 illustrates an exemplary signal timing diagram 1500 for the memory data scrubber circuit 202 performing this functionality. FIG. 16 is a flowchart illustrating an exemplary process 1600 for the memory data scrubber circuit 202 in the memory system 200 in FIG. 2 to be able to write corrected data to the memory array 208 as part of a memory data scrubbing operation as provided in the examples in FIGS. 9-12 above, but wait to initiate memory data scrubbing operations in response to receipt of the power-up signal 210 until the memory controller 206 is in a powered-down state, as provided in the examples in FIGS. 7 and 8. FIGS. 15 and 16 will be discussed in conjunction with each other.

With reference to FIG. 15, after the memory data scrubber circuit 202 determines that the power-up signal 210 indicates a powered-up state (e.g., a higher signal level) (block 1602 in FIG. 16), memory transactions are accepted from the memory controller 206 (block 1502 in FIG. 15, block 1604 in FIG. 16). The memory transactions requested by the memory controller 206 may be read or write operations to the memory 204. If the requested memory transaction is a read operation, the read operation is executed by the memory 204 (block 1606 in FIG. 16). In the exemplary signal timing diagram 1500 in FIG. 15, the ECC circuit 214 in FIG. 2 has determined that a data error exists in data A (data_a) (block 1608 in FIG. 16). In response, the memory data scrubber circuit 202 stores the memory address (addr) and corresponding data (data) stored at the memory address (addr) in the memory array 208 into a scrubbing queue 232 (block 1610 in FIG. 16). In the example in FIG. 15, the memory address A (addr_a) and corresponding data A (data_a), are stored in the scrubbing queue 232(1) in the memory data scrubber circuit 202. This is so that memory address A (addr_a) and corresponding data A (data_a) are available during a subsequent memory data scrubbing operation to write corrected data to memory address A (addr_a) in the memory array 208.

With continuing reference to FIG. 16, if the memory controller 206 requests a write operation, the write operation is executed (block 1612). For example, in this manner, if the write operation memory address matches the memory address stored in the scrubbing queue 232 and has erroneous, correctable data (block 1614 in FIG. 16), such memory address can be removed from the scrubbing queue 232 (block 1616 in FIG. 16). This is because the memory address in the memory array 208 will be overwritten by the memory controller 206, so there is no need for the memory data scrubber circuit 202 to write corrected data previously stored at the memory address in the memory array 208.

Next, once the power-up signal 210 is determined to indicate a powered-down state (e.g., a lower signal level) of the memory controller 206 (block 1618 in FIG. 16), a read data command (SCRD) is placed on the internal command/memory address bus (icmd/iaddr) 220, and the next scrubbing memory address 213 (saddr) is provided as the memory address on the internal command/memory address bus (icmd/iaddr) 220 (block 1504 in FIG. 15, block 1620 in FIG. 16). The data read at the next scrubbing memory address 213 (saddr) from the memory array 208 is stored in scrubbing queue 232(2) (block 1504 in FIG. 15, block 1622 in FIG. 16). Next, memory data scrubbing operations are performed by the memory data scrubber circuit 202 (block 1510 in FIG. 15, block 1626 in FIG. 16) if the scrub signal 234 is asserted to enable a memory data scrubbing operation (e.g., a higher signal level) (block 1510 in FIG. 15, block 1624 in FIG. 16). With reference to the example in FIG. 15, the memory data scrubber circuit 202 asserts a write command (WR) for corrected data A (data_a) stored in scrubbing queue 232(1) to be written to memory address A (addr_a) stored in scrubbing queue 232(2) in the memory array 208 (block 1510 in FIG. 15, block 1624 in FIG. 16). The memory data scrubber circuit 202 issues a writes command (WR) to the write corrected data (sdata) for the next scrubbing memory address 213 stored in scrubbing queue 232(2) to be written to the next scrubbing memory address 213 in the memory array 208 (block 1510 in FIG. 15, block 1626 in FIG. 16).

The next scrubbing memory address 213 is incremented as "saddr+" to a next scrubbing memory address 213' and placed on the internal data input bus 226 (block 1512 in FIG. 15, block 1628 in FIG. 16). A scrub command write command (SAWR) is issued on the internal command/memory address bus (icmd/iaddr) 220 to write the next scrubbing memory address 213' to the memory array 208 for the next memory data scrubbing operation performed at the next wake-up of the memory controller 206 (block 1512 in FIG. 15, block 1628 in FIG. 16).

Data read from a memory location in the memory array 208 in the memory 204 in FIG. 2 may be detected as erroneous by the ECC circuit 214, because of a hard error in memory bitcells at the memory location, as opposed to a soft error. In this regard, it may be desired to remap a memory location in the memory array 208 to another memory location if data stored at the original memory location is determined to be erroneous and uncorrectable. In this regard, the memory data scrubber circuit 202 may be configured to detect if an error in data retrieved from a given memory location in the memory array 208 is uncorrectable as part of a memory data scrubbing operation to write corrected data to the memory location.

Figure 17:
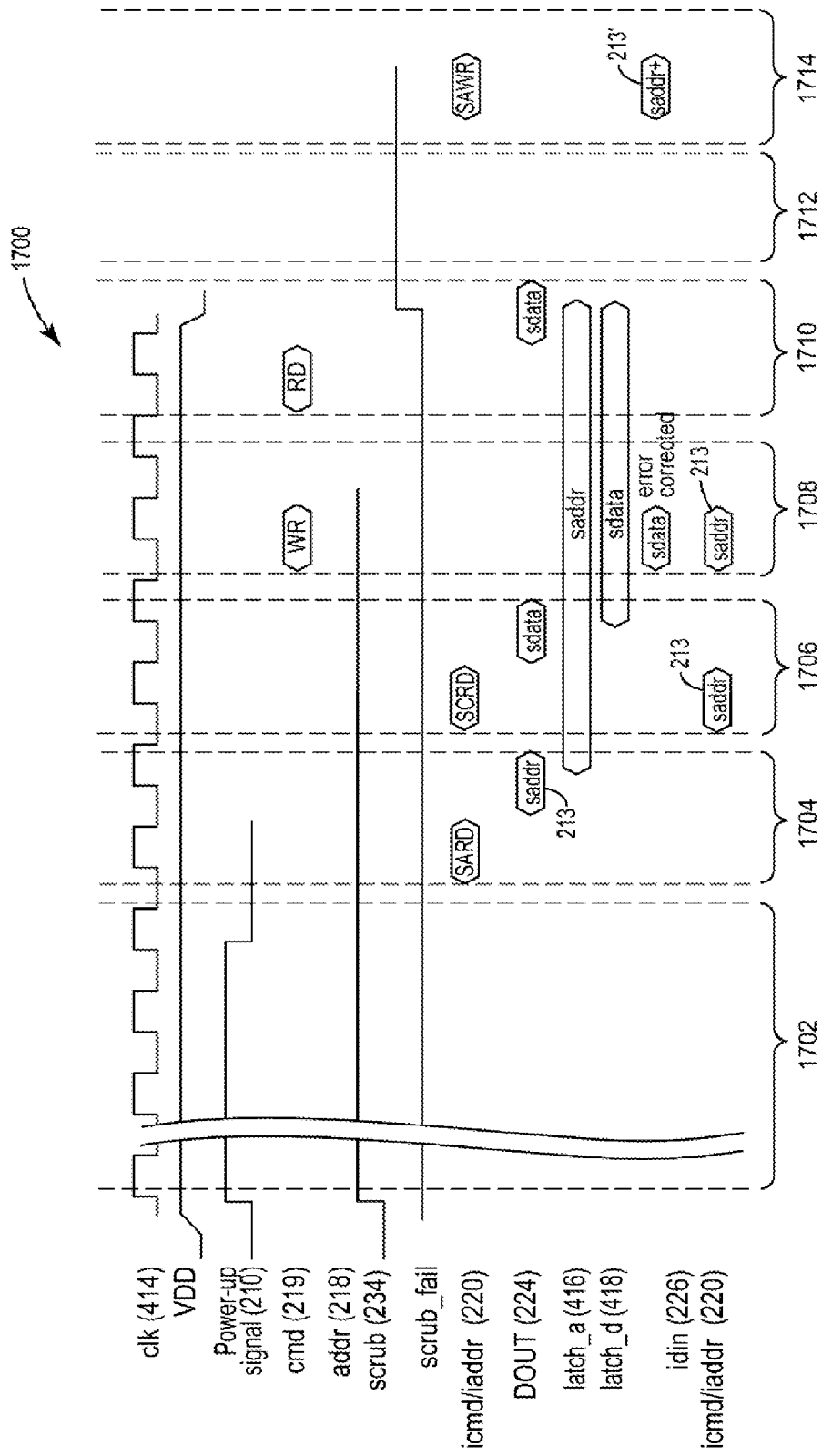
FIG. 17 is an exemplary signal timing diagram for the memory system in FIG. 2 illustrating the memory data scrubber circuit scrubbing memory data stored at a memory address(es) in memory, in response to a powered-up state of the memory controller during a processor idle period, wherein the scrubbing of the memory data at the memory address is verified and the memory address is remapped to a new address if the scrubbing fails.
Figure 18:
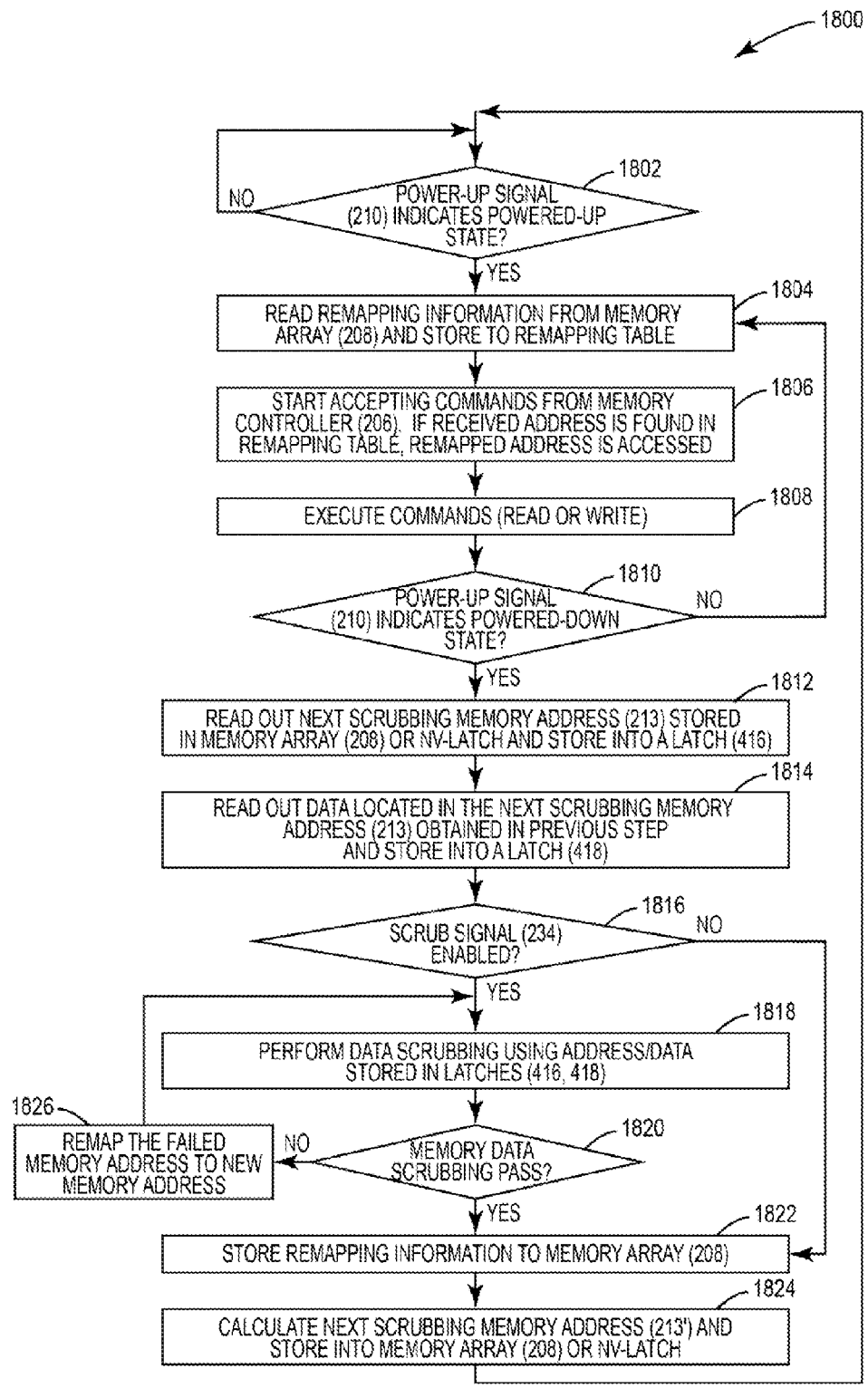
FIG. 18 is a flowchart illustrating an exemplary process of the memory data scrubber circuit in FIG. 2 scrubbing memory data stored at a memory address(es) in memory, in response to a powered-up state of the memory controller during a processor idle period, wherein the memory data scrubber circuit is configured to verify the scrubbing of the memory data at the memory address and remap the memory address to a new memory address if the scrubbing fails.

In this regard, FIG. 17 illustrates an exemplary signal timing diagram 1700 for the memory data scrubber circuit 202 in FIG. 2 to remap a data scrubbed memory location determined to contain a hard error to a new memory location in the memory array 208. FIG. 18 is a flowchart illustrating an exemplary process 1800 for the memory data scrubber circuit 202 in the memory system 200 in FIG. 2 to be able to remap a data scrubbed memory location determined to contain a hard error to a new memory location in the memory array 208. FIGS. 17 and 18 will be discussed in conjunction with each other below With reference to FIG. 17, after the memory data scrubber circuit 202 determines that the power-up signal 210 indicates a powered-up state (e.g., a higher signal level) (block 1802 in FIG. 18), remapping information from the memory array 208 is read and stored to a memory address remapping table (block 1804 in FIG. 18). This is because certain memory locations in the memory array 208 may have been previously remapped to different locations due to hard errors, as discussed below. The memory address remapping table may be stored in the memory array 208 at a defined location or partition. Next, memory transactions are accepted from the memory controller 206 (block 1702 in FIG. 17, block 1806 in FIG. 18). The memory address remapping table is used to re-direct memory addresses in memory commands requested by the memory controller 206 to a remapped memory address in the memory array 208. The memory transactions requested by the memory controller 206 are executed (block 1702 in FIG. 17, block 1808 in FIG. 18).

Next, once the power-up signal 210 is determined to indicate a powered-down state (e.g., a lower signal level) of the memory controller 206 (block 1810 in FIG. 18), a read data command (SCRD) is placed on the internal command/memory address bus (icmd/iaddr) 220, and the next scrubbing memory address 213 (saddr) is provided as the memory address on the internal command/memory address bus (icmd/iaddr) 220 (block 1704 in FIG. 17, block 1812 in FIG. 18). The next scrubbing memory address 213 and data read at the next scrubbing memory address 213 (saddr) from the memory array 208 are stored in latches 416, 418, respectively (blocks 1704-1706 in FIG. 17, block 1812-1814 in FIG. 18). In response to the scrub signal 234 indicating a memory data scrubbing operation to be performed (e.g., the scrub signal 234 is a higher signal level) (block 1816 in FIG. 18), memory data scrubbing operations are performed by the memory data scrubber circuit 202 (block 1708 in FIG. 17, block 1818 in FIG. 18). With reference to the example in FIG. 17, the memory data scrubber circuit 202 issues a writes command (WR) to the write corrected data (sdata) for the next scrubbing memory address 213 stored in the latches 416, 418 to be written to the next scrubbing memory address 213 in the memory array 208 (block 1708 in FIG. 17, block 1818 in FIG. 18).

Next, the memory data scrubber circuit 202 verifies if the data scrubbing at next scrubbing memory address 213 (saddr) in the memory array 208 was successful or passed (block 1710 in FIG. 17, block 1820 in FIG. 18). If the corrected data was successful stored in the next scrubbing memory address 213 (saddr) in the memory array 208, the next scrubbing memory address 213 (saddr) is not remapped to another memory address in the memory array 208 (block 1822 in FIG. 18). The next scrubbing memory address 213 is incremented as "saddr+" to a next scrubbing memory address 213' and placed on the internal data input bus 226 (block 1714 in FIG. 17, block 1824 in FIG. 18). A scrub command write command (SAWR) is issued on the internal command/memory address bus (icmd/iaddr) 220, to write the next scrubbing memory address 213' to the memory array 208 for the next memory data scrubbing operation performed at the next wake-up of the memory controller 206 (block 1714 in FIG. 17, block 1824 in FIG. 18). However, if the corrected data was determined to not be successfully stored in the next scrubbing memory address 213 (saddr) in the memory array 208, this is an indication that a hard error may exist at the next scrubbing memory address 213 (saddr) in the memory array 208. Thus, the memory data scrubber circuit 202 can be configured to remap the next scrubbing memory address 213 (saddr) to another memory address in the memory array 208 in the memory address remapping table (block 1712 in FIG. 17, block 1826 in FIG. 18). In this manner, the original memory address determined to have a hard error is remapped to a new memory address in the memory array 208 that can then be used to store data for memory transactions to the original memory address.

The memory systems that include memory data scrubber circuits configured to perform memory data scrubbing operations in a processor-based memory to provide data error correction in response to periodic memory controller wake-up periods according to aspects disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 19:
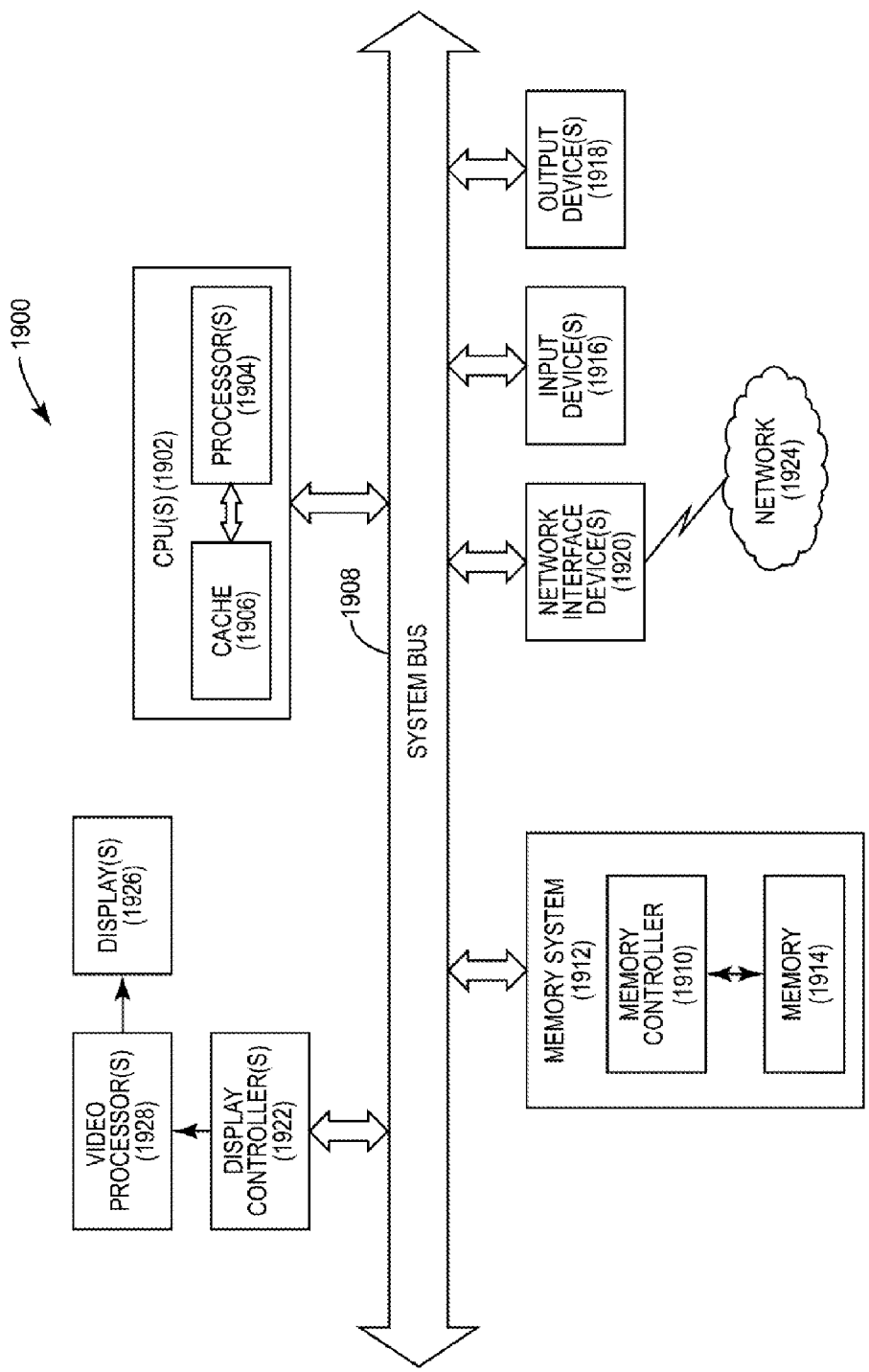
FIG. 19 is a block diagram of an exemplary processor-based system that can include a memory system that includes any of the memory data scrubber circuits disclosed herein.

In this regard, FIG. 19 illustrates an example of a processor-based system 1900 that can employ a memory system employing a memory data scrubber circuit configured to perform memory data scrubbing operations in a processor-based memory to provide data error correction in response to periodic memory controller wake-up periods. In this example, the processor-based system 1900 includes one or more central processing units (CPUs) 1902, each including one or more processors 1904. The CPU(s) 1902 may have cache memory 1906 coupled to the processor(s) 1904 for rapid access to temporarily stored data. The CPU(s) 1902 is coupled to a system bus 1908 and can intercouple master and slave devices included in the processor-based system 1900. As is well known, the CPU(s) 1902 communicates with these other devices by exchanging address, control, and data information over the system bus 1908. For example, the CPU(s) 1902 can communicate bus transaction requests to a memory controller 1910 in a memory system 1912 as an example of a slave device. Although not illustrated in FIG. 19, multiple system buses 1908 could be provided, wherein each system bus 1908 constitutes a different fabric. In this example, the memory controller 1910 is configured to provide memory access requests to memory 1914 in the memory system 1912. The memory 1914 can include a memory data scrubber circuit configured to perform memory data scrubbing operations in a processor-based memory to provide data error correction in response to periodic memory controller wake-up periods, and according to any of the aspects disclosed herein.

Other master and slave devices can be connected to the system bus 1908. As illustrated in FIG. 19, these devices can include the memory system 1912, one or more input devices 1916, one or more output devices 1918, one or more network interface devices 1920, and one or more display controllers 1922, as examples. The input device(s) 1916 can include any type of input device, including but not limited to input keys, switches, voice processors, etc. The output device(s) 1918 can include any type of output device, including but not limited to audio, video, other visual indicators, etc. The network interface device(s) 1920 can be any devices configured to allow exchange of data to and from a network 1924. The network 1924 can be any type of network, including but not limited to a wired or wireless network, a private or public network, a local area network (LAN), a wide local area network (WLAN), and the Internet. The network interface device(s) 1920 can be configured to support any type of communications protocol desired.

The CPU(s) 1902 may also be configured to access the display controller(s) 1922 over the system bus 1908 to control information sent to one or more displays 1926. The display controller(s) 1922 sends information to the display(s) 1926 to be displayed via one or more video processors 1928, which process the information to be displayed into a format suitable for the display(s) 1926. The display(s) 1926 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory system for a processor-based system, comprising:
   a memory;
   a memory controller configured to:
      periodically power-up during idle periods of a processor;
      generate a power-up signal indicating a powered-up state of the memory controller;
      respond to requests from the processor to perform memory transactions to the memory in response to the powered-up state; and
      generate the power-up signal indicating a powered-down state of the memory controller in response to an idle period of the processor; and
   a memory data scrubber circuit configured to:
      receive the power-up signal from the memory controller; and
      perform a memory data scrubbing operation on at least one next scrubbing memory address in the memory in response to receiving the power-up signal from the memory controller and independent of the powered-down state of the memory controller.

2. The memory system of claim 1, wherein the memory controller is configured to periodically power-up during the idle periods of the processor to receive at least one memory access request to the memory.

3. The memory system of claim 1, wherein the memory data scrubber circuit is not provided in the memory controller.

4. The memory system of claim 1, wherein the memory data scrubber circuit is provided in the memory.

5. The memory system of claim 1, wherein:
   the memory controller is configured generate the powered-up state in the power-up signal in response to the memory controller powering up after the idle period of the processor; and
   the memory data scrubber circuit is configured to initiate the performance of the memory data scrubbing operation on the at least one next scrubbing memory address in the memory in response to receiving the power-up signal indicating the powered-up state of the memory controller.

6. The memory system of claim 1, wherein the memory data scrubber circuit is further configured to:
   determine if at least one memory address of at least one memory access request comprising at least one write operation from the memory controller matches the at least one next scrubbing memory address; and
   perform the memory data scrubbing operation on the at least one next scrubbing memory address if the at least one memory address of the at least one write operation does not match the at least one next scrubbing memory address in the memory.

7. The memory system of claim 6, wherein the memory data scrubber circuit is further configured to:
   determine if the at least one memory address of the at least one write operation from the memory controller matches the at least one next scrubbing memory address; and
   if the at least one memory address of the at least one write operation matches the at least one next scrubbing memory address, not perform the memory data scrubbing operation on the at least one next scrubbing memory address in the memory.

8. The memory system of claim 7, wherein if the at least one memory address of the at least one write operation matches the at least one next scrubbing memory address, the memory controller is further configured to perform the at least one write operation on the at least one next scrubbing memory address in the memory.

9. The memory system of claim 1, wherein:
   the memory controller is configured to generate the powered-down state in the power-up signal in response to the memory controller powering down after the idle period of the processor; and
   the memory data scrubber circuit is configured to perform the memory data scrubbing operation on the at least one next scrubbing memory address in the memory after the received power-up signal indicates the powered-down state of the memory controller.

10. The memory system of claim 1, wherein the memory data scrubber circuit is further configured to set the at least one next scrubbing memory address to at least one memory address of at least one memory access request comprising at least one read operation if at least one read data for the at least one read operation contains an error.

11. The memory system of claim 10, wherein the memory data scrubber circuit is further configured to:
   determine if the at least one memory address of the at least one read operation having the at least one read data containing the error matches the at least one memory address of the at least one memory access request comprising at least one write operation; and
   if the at least one memory address of the at least one read operation having the at least one read data containing the error matches the at least one memory address of the at least one memory access request comprising the at least one write operation from the memory controller, not perform the memory data scrubbing operation on the at least one memory address of the at least one read operation having the at least one read data containing the error.

12. The memory system of claim 10, wherein the memory data scrubber circuit is further configured to:
   determine if the at least one memory address of the at least one memory access request further comprising at least one write operation from the memory controller matches the at least one next scrubbing memory address; and
   perform the memory data scrubbing operation on the at least one next scrubbing memory address if the at least one memory address of the at least one write operation does not match the at least one next scrubbing memory address in the memory.

13. The memory system of claim 12, wherein the memory data scrubber circuit is further configured to:
   determine if the at least one memory address of the at least one write operation from the memory controller matches the at least one next scrubbing memory address; and
   if the at least one memory address of the at least one write operation matches the at least one next scrubbing memory address, not perform the memory data scrubbing operation on the at least one next scrubbing memory address in the memory.

14. The memory system of claim 12, wherein the memory data scrubber circuit is configured to perform the memory data scrubbing operation on the at least one next scrubbing memory address in the memory after the received power-up signal indicates the powered-down state of the memory controller.

15. The memory system of claim 1, wherein the memory data scrubber circuit is further configured to:
   verify the memory data scrubbing operation performed on memory data in the at least one next scrubbing memory address failed; and
   remap the at least one next scrubbing memory address to at least one new memory address in the memory if verification of the memory data scrubbing operation performed on the memory data in the at least one next scrubbing memory address failed.

16. The memory system of claim 1, wherein the memory data scrubber circuit is further configured to:
   determine the at least one next scrubbing memory address in the memory to be data scrubbed; and
   store the determined at least one next scrubbing memory address as the at least one next scrubbing memory address.

17. The memory system of claim 1, wherein the memory is comprised of magnetic random access memory (MRAM).

18. The memory system of claim 1 integrated into an integrated circuit (IC).

19. The memory system of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

20. A memory system for a processor-based system, comprising:
   a means for storing data;
   a means for controlling configured for:
      periodically powering-up during idle periods of a processor;
      generating a power-up signal indicating a powered-up state of the means for controlling;
      responding to requests from the processor to perform memory transactions to the means for storing data in response to the powered-up state; and
      generating the power-up signal indicating a powered-down state of the means for controlling in response to an idle period of the processor; and
   a means for scrubbing configured for:
      receiving the power-up signal from the means for controlling; and
      performing a memory data scrubbing operation on at least one next scrubbing memory address in the means for storing data in response to receiving the power-up signal from the means for controlling and independent of the powered-down state of the means for controlling.

21. A method for scrubbing memory data in a memory of a memory system for a processor-based system, comprising:
   receiving a power-up signal from a memory controller indicating a powered-up state of the memory controller in response to the memory controller waking-up during an idle period of a processor;
   responding to requests from the processor to perform memory transactions to the memory in response to the powered-up state;
   receiving the power-up signal indicating a powered-down state of the memory controller in response to the idle period of the processor; and
   performing a memory data scrubbing operation on at least one next scrubbing memory address in the memory in response to the received power-up signal from the memory controller and independent of the powered-down state of the memory controller.

22. The method of claim 21, comprising starting the performance of the memory data scrubbing operation on the at least one next scrubbing memory address in the memory in response to receiving the power-up signal indicating the powered-up state of the memory controller.

23. The method of claim 21, further comprising:
   determining if at least one memory address of at least one memory access request comprising at least one write operation from the memory controller matches the at least one next scrubbing memory address; and
   performing the memory data scrubbing operation on the at least one next scrubbing memory address if the at least one memory address of the at least one write operation does not match the at least one next scrubbing memory address in the memory.

24. The method of claim 23, further comprising:
   determining if the at least one memory address of the at least one write operation from the memory controller matches the at least one next scrubbing memory address; and
   if the at least one memory address of the at least one write operation matches the at least one next scrubbing memory address, not performing the memory data scrubbing operation on the at least one next scrubbing memory address in the memory.

25. The method of claim 21, comprising performing the memory data scrubbing operation on the at least one next scrubbing memory address in the memory in response to receiving the power-up signal indicating the powered-down state of the memory controller.

26. The method of claim 21, further comprising setting the at least one next scrubbing memory address to at least one memory address of at least one memory access request comprising at least one read operation if at least one read data for the at least one read operation contains an error.

27. The method of claim 26, further comprising:
   determining if the at least one memory address of the at least one read operation having the at least one read data containing the error matches the at least one memory address of the at least one memory access request comprising at least one write operation; and
   if the at least one memory address of the at least one read operation having the at least one read data containing the error matches the at least one memory address of the at least one memory access request comprising the at least one write operation from the memory controller, not performing the memory data scrubbing operation on the at least one memory address of the at least one read operation having the at least one read data containing the error.

28. The method of claim 26, further comprising:
   determining if the at least one memory address of the at least one memory access request further comprising at least one write operation from the memory controller matches the at least one next scrubbing memory address; and
   performing the memory data scrubbing operation on the at least one next scrubbing memory address if the at least one memory address of the at least one write operation does not match the at least one next scrubbing memory address in the memory.

29. The method of claim 21, further comprising:
verifying the memory data scrubbing operation performed on memory data in the at least one next scrubbing memory address failed; and
remapping the at least one next scrubbing memory address to at least one new memory address in the memory if verification of the memory data scrubbing operation performed on the memory data in the at least one next scrubbing memory address failed.

30. A non-transitory computer-readable medium having stored thereon computer executable instructions which, when executed by a processor, cause a memory system for a processor-based system to:
receive a power-up signal from a memory controller indicating a powered-up state of the memory controller in response to the memory controller waking-up during an idle period of the processor;
respond to requests from the processor to perform memory transactions to a memory in response to the powered-up state;
receive the power-up signal indicating a powered-down state of the memory controller in response to the idle period of the processor; and
perform a memory data scrubbing operation on at least one next scrubbing memory address in the memory in response to the received power-up signal indicating the powered-up state of the memory controller and independent of the powered-down state of the memory controller.

* * * * *